(12) United States Patent
Wichgers et al.

(10) Patent No.: US 8,234,020 B1
(45) Date of Patent: Jul. 31, 2012

(54) SYSTEMS AND METHODS FOR GENERATING ALERT SIGNALS IN A TERRAIN AWARENESS AND WARNING SYSTEM

(75) Inventors: Joel M. Wichgers, Urbana, IA (US);
Richard D. Jinkins, Rewey, WI (US);
Patrick D. McCusker, Walker, IA (US);
Richard M. Rademaker, Rijswijk ZH (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 1210 days.

(21) Appl. No.: 12/069,234

(22) Filed: Feb. 8, 2008

(51) Int. Cl.
*G01C 5/00* (2006.01)
(52) U.S. Cl. .......................................... 701/9
(58) Field of Classification Search .................. 701/9
See application file for complete search history.

(56) References Cited

U.S. PATENT DOCUMENTS

| | | | |
|---|---|---|---|
| 3,165,740 A | 1/1965 | Stoney | |
| 3,241,068 A | 3/1966 | Moulton | |
| 3,568,187 A | 3/1971 | Bechtel et al. | |
| 3,739,380 A | 6/1973 | Burdic et al. | |
| 4,914,436 A | 4/1990 | Bateman et al. | |
| 5,839,080 A | 11/1998 | Muller et al. | |
| 6,092,009 A | 7/2000 | Glover | |
| 6,122,570 A * | 9/2000 | Muller et al. | 701/9 |
| 6,138,060 A | 10/2000 | Conner et al. | |
| 6,219,592 B1 | 4/2001 | Muller et al. | |
| 7,145,501 B1 | 12/2006 | Manfred et al. | |
| 7,386,373 B1 | 6/2008 | Chen et al. | |

OTHER PUBLICATIONS

U.S. Appl. No. 11/904,483, filed Sep. 26, 2007, McCusker.
U.S. Appl. No. 11/904,484, filed Sep. 26, 2007, McCusker.
U.S. Appl. No. 11/904,491, filed Sep. 26, 2007, McCusker et al.
U.S. Appl. No. 11/904,492, filed Sep. 26, 2007, McCusker.

* cited by examiner

*Primary Examiner* — Eric Culbreth
(74) *Attorney, Agent, or Firm* — Donna P. Suchy; Daniel M. Barbieri

(57) ABSTRACT

A terrain awareness and warning system ("TAWS") provides input to a terrain alert ("TA") processor from at least one real-time aircraft system or sensor and a source of terrain data; the processor determines a terrain clearance surface and a terrain airspace alert surface, and if one surface penetrates the other, the processor generates an alert signal and provides an alert signal to a crew alerting system. The two surfaces are determined by the processor by executing an algorithm(s) embedded in software containing the disclosed embodiments and methods. At least one criterion used to define an aircraft terrain alert surface is programmed to include real-time and/or static input factor data provided by at least one system or sensor input from an aircraft. Such input factor could be used to define a terrain clearance surface.

42 Claims, 18 Drawing Sheets

SYSTEMS AND METHODS FOR GENERATING ALERT SIGNALS IN A TERRAIN AWARENESS AND WARNING SYSTEM

BACKGROUND OF THE INVENTION

1. Field of the Invention

This invention pertains to the field of alert signals being provided to the pilot of an aircraft, where such signals are generated by a terrain awareness and warning system.

2. Description of the Related Art

Beginning in the early 1970's, a number of studies looked at the occurrence of "controlled flight into terrain" (CFIT)-type accidents, where a properly functioning airplane that is under the control of a fully qualified and certificated crew is flown into terrain (or water or obstacles) with no apparent awareness on the part of the crew. Findings from these studies indicated that many such accidents could have been avoided if a warning device called a ground proximity warning system ("GPWS") was used. There have been numerous patents issued in the field of GPWS and related art. A sampling of patents issued in the art and related art include U.S. Pat. Nos. 5,839,080; 6,092,009; 6,122,570; 6,138,060; 6,219,592; 7,145,501; 7,908,045; and 8,019,491. A sampling of patents applications in the art and related art include U.S. patent application Ser. Nos. 11/904,491 and 11/904,492.

Advances in technology have permitted vendors and designers of avionics equipment to develop a newer type of GPWS that provides greater situational awareness for flight crews. The U.S. Federal Aviation Administration ("FAA") has classified such systems as Terrain Awareness and Warning Systems ("TAWS"). The advancement of technologies—more precise navigation systems, increased computer memory storage, and better display technology—have allowed further development of the common features of TAWS: (1) use of airplane position information from the aircraft's navigation system(s), (2) an onboard terrain database, and (3) a means of displaying the surrounding terrain. Aircraft position information from the aircraft's navigation system is fed to a TAWS computer. The TAWS computer compares the airplane's current position and flight path with the terrain database associated with the system. If there is a potential threat of collision with terrain, the TAWS computer sends warning alerts to the airplane's audio system.

There are scenarios for which TAWS has been implemented. These scenarios may be categorized by the flight operations in which aircraft accidents have occurred: departure operations, enroute operations, and arrival operations. First, departure operations could include accidents in which the aircraft does not climb fast enough to clear a terrain cell of interest and in which a pilot has leveled off before the aircraft has achieved the appropriate altitude to clear the terrain. Second, enroute operations could include accidents associated with level flight into terrain and descending flight into terrain. Third, arrival operations could include accidents associated with premature descents and late level-offs in a step down arrival procedure. The embodiments disclosed herein present novel and non-trivial systems and methods which address these scenarios.

BRIEF SUMMARY OF THE INVENTION

The embodiments disclosed herein present novel and non-trivial systems and methods for generating and providing alerts in terrain awareness and warning system ("TAWS"). As disclosed herein, a TAWS provides safety and awareness to the pilot of an aircraft by generating one or more alert signals associated with an aircraft operating near terrain, obstacles, and/or defined airspace, including any combination thereof. As embodied herein, a terrain alert ("TA") processor may define two surfaces based upon criteria selected by a manufacturer (e.g., an aircraft terrain alert surface and a terrain clearance surface) and generate an alert signal and present such signal to a crew alerting system based upon the penetration of one surface by another. One surface may be a terrain alert surface that has been defined by the TA processor and based upon a terrain maneuver profile defined in an algorithm by a manufacturer or end-user using at least one criterion, where each criterion may include at least one real-time and/or static input factor. The other surface may be a terrain clearance surface that has been defined by the TA processor and based upon the input of navigation data, terrain data, and airport-related data.

In one embodiment, a system for generating an alert signal in a TAWS is disclosed. The system could be comprised of a data source for providing input factor data, a data source of terrain data, a TA processor, and a crew alerting system. As embodied herein, the terrain data may be provided by a radar system and/or a terrain database. Terrain data may include data representative of terrain, obstacles, or both. The TA processor could receive input factor data and terrain data, define a terrain clearance surface and at least one aircraft terrain alert surface, generate a terrain alert signal if the terrain clearance surface penetrates an aircraft terrain alert surface, and provide an alert signal to a crew alerting system for visual presentation to the pilot by a display unit, aural presentation by an aural unit, and/or tactile presentation by a tactile unit, including any combination thereof.

In another embodiment, a second system for generating an alert signal in a TAWS is disclosed. The system could be comprised of a data source for providing input factor data, a data source of terrain data, a TA processor, and a crew alerting system. As embodied herein, the terrain data may be provided by a radar system and a terrain database. The TA processor could receive input factor data, terrain data that is representative of a terrain clearance surface, define at least one aircraft terrain alert surface, generate a terrain alert signal if the terrain clearance surface penetrates an aircraft terrain alert surface, and provide an alert signal to a crew alerting system for visual presentation to the pilot by a display unit, aural presentation by an aural unit, and/or tactile presentation by a tactile unit, including any combination thereof.

Alert signals associated with an airspace awareness and warning system ("AAWS") could be incorporated into systems disclosed herein. In an additional embodiment, either system could include a data source for providing airspace data. The TA processor could receive the aircraft position data and associated airspace data, define an airspace clearance surface, define at least one aircraft airspace alert surface, generate an alert signal if the airspace clearance surface penetrates an aircraft airspace alert surface, and provide the airspace alert signal to a crew alerting system.

In an additional embodiment, either system could include a data source for providing airspace data. The TA processor could receive the aircraft position data and associated airspace data representative of an aircraft clearance surface, define at least one aircraft airspace alert surface, generate an alert signal if the airspace clearance surface penetrates an aircraft airspace alert surface, and provide the airspace alert signal to a crew alerting system.

In another embodiment, a method for generating an alert signal in a TAWS is disclosed. The method could be comprised of a TA processor receiving input factor data and terrain data, defining a terrain clearance surface and at least one terrain alert surface, generating a terrain alert signal if the terrain clearance surface penetrates a aircraft terrain alert surface, and providing the first terrain alert signal to a crew alerting system for visual presentation to the pilot by a display unit, aural presentation by an aural unit, and/or tactile presentation by a tactile unit, including any combination thereof.

In another embodiment, a second method for generating an alert signal in a TAWS is disclosed. The method could be comprised of a TA processor receiving input factor data and terrain data that is representative of a terrain clearance surface, defining at least one terrain alert surface, generating a terrain alert signal if the terrain clearance surface penetrates an aircraft terrain alert surface, and providing an alert signal to a crew alerting system for visual presentation to the pilot by a display unit, aural presentation by an aural unit, and/or tactile presentation by a tactile unit, including any combination thereof.

Alert signals associated with an AAWS could be incorporated into the methods embodied herein. In an additional embodiment, either method could include a TA processor receiving the aircraft position data and associated airspace data, defining an airspace clearance surface and at least one aircraft airspace alert surface, generating an airspace alert signal if the airspace clearance surface penetrates an aircraft airspace alert surface, and providing the airspace alert signal to a crew alerting system.

In an additional embodiment, either method could include a TA processor receiving the aircraft position data and associated airspace data representative of an aircraft clearance surface, defining at least one aircraft airspace alert surface, generating an airspace alert signal if the airspace clearance surface penetrates an aircraft airspace alert surface, and providing the airspace alert signal to a crew alerting system.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
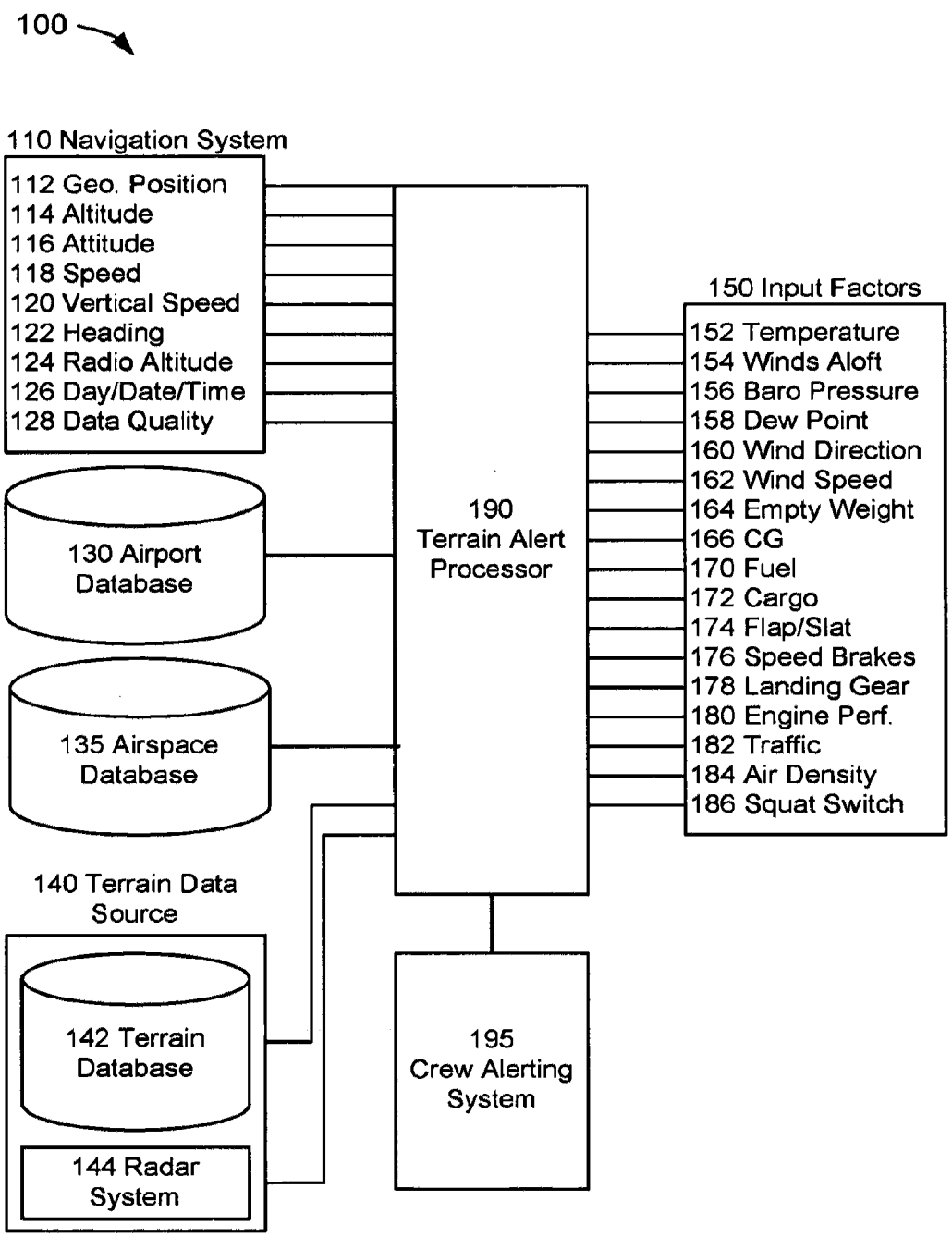
FIG. 1 depicts a block diagram of a system for generating an alert signal in a terrain-awareness and warning system.

FIG. 1 depicts a terrain awareness and warning system 100 suitable for implementation of the techniques described herein. The system may be comprised of a navigation system 110, an airport database 130, an airspace database 135, a terrain data source 140, maneuver profile input factors 150, a terrain alert ("TA") processor 190, and a crew alerting system 195.

A navigation system 110 comprises those systems that provide navigation data information in an aircraft. A navigation system 110 may include, but is not limited to an air/data system, an attitude heading reference system, an inertial guidance system (or inertial reference system), a global navigation satellite system (or satellite navigation system), and a flight management computing system, of all which are known to those skilled in the art. For the purposes of the embodiments herein, a radio altimeter system may be included in the navigation system 110; a radio altimeter system is known to those skilled in the art for determining the altitude above the surface over which the aircraft is currently operating. As embodied herein, a navigation system 110 could provide navigation data including, but not limited to, geographic position 112, altitude 114, attitude 116, speed 118, vertical speed 120, heading 122, radio altitude 124, day/date/time 126, and navigation data quality 128 to a TA processor 190 for subsequent processing as discussed herein. Navigation data quality 128 may include, but are not limited to, accuracy, uncertainty, integrity, and validity for data provided by a navigation system 110. As embodied herein, aircraft position comprises geographic position 112 (e.g., latitude and longitude coordinates) and altitude 114. Day/date/time 126 could be data representative of the day, date, or time, or any combination of them, and may be used, for example, for determining whether a defined airspace is in effect. Navigation data may be used, in part, to identify a phase of flight of an aircraft and flight attitude, two parameters which may be used to determine a minimum terrain clearance in a terrain awareness and warning system.

An airport database 130 may be used to store airport-related data including, but not limited to, airport and runway information. It should be noted that data contained in any database discussed herein including an airport database 130, an airspace database 135, and a terrain database 142 may be stored in a digital memory storage device or computer-readable media including, but not limited to, RAM, ROM, CD, DVD, hard disk drive, diskette, solid-state memory, PCMCIA or PC Card, secure digital cards, and compact flash cards.

Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary runway closure could be stored in an airport database 130, a temporary flight restriction in airspace database 135, and a temporary obstacle in terrain database 142. Any database used in the embodiments disclosed herein may be a stand-alone database or a combination of databases. For example, an airport database 130 may be associated with a TAWS 100 only. In an alternative embodiment, terrain data could be stored in or combined with an airport database 130 or with a database used by any other system of the aircraft including, but not limited to, a database associated with a flight management computing system and an airspace awareness and warning system ("AAWS").

Airport information could include surveyed location and elevation data, and runway information could include surveyed location and elevation data of the runway and runway threshold. Airport-related data may be used, in part, to identify a phase of flight of an aircraft, a parameter which may be used to define minimum terrain clearance standards in a terrain awareness and warning system. An example of a database which may provide a source of airport-related data as embodied herein may be a navigation database included as part of a flight management computing system. As embodied herein, an airport database 130 could provide airport-related data to a TA processor 190 for subsequent processing as discussed herein.

A TAWS 100 could include an airspace database 135. An example of an airspace database is provided in U.S. Pat. No. 7,714,744 entitled "System and Method for Generating Alert Signals in an Airspace Awareness and Warning System," which is incorporated by reference in its entirety.

An airspace database 135 may be used to store airspace related data including, but not limited to, information related to regulatory special use airspace area and non-regulatory special use airspace area data. Data contained in an airspace database 135 could be provided to a TA processor 190 for determination of a surface representative of airspace and/or for determination of an airspace clearance surface. In one embodiment, data contained in an airspace database 135 could be representative of an airspace surface.

In another embodiment, an airspace database 135 may be comprised of one or more databases, where each database could include data representative of one or more airspace clearance surfaces, where each airspace clearance surface could correspond to a specific phase of flight and flight attitude.

Regulatory special use airspace data may be comprised of, in part, prohibited areas and restricted areas. Non-regulatory special use airspace data may be comprised of, in part, military operations areas, alert areas, warning areas, and national security areas. Prohibited areas contain airspace of defined dimensions identified by an area within which the flight of aircraft is prohibited. Such areas may be established for safety, security, national defense, national welfare, or other reasons. Restricted areas contain airspace within which the flight of aircraft, while not wholly prohibited, is subject to restrictions. Restricted areas may denote the existence of unusual, often invisible, hazards to aircraft such as artillery firing, aerial gunnery, or guided missiles. Penetration of restricted areas without authorization from a using or controlling agency may be extremely hazardous to the aircraft and its occupants.

Airspaces are depicted on aeronautical charts or discussed in other operational publications which provide aeronautical information. An airspace may be delineated by vertical and/or horizontal dimensions. The vertical dimensions of airspace may be designated by altitude floors and ceilings expressed as flight levels or other appropriate measures such as feet or meters above mean sea level (MSL) or other reference including the surface of the earth. The horizontal dimensions of an airspace may be defined by geographic coordinates (e.g., latitude ("lat.") and longitude ("long.")) or other appropriate references that clearly define their perimeter. An airspace may be in effect for one or more designated time periods or run continuously.

Generally, an aviation regulatory authority or organization possesses the authority of designating and defining airspace. In the United States, the Federal Aviation Administration ("FAA") establishes and provides the defined dimensions of airspace. For example, FAA Order 7400.8 entitled "Special Use Airspace" provides a listing of regulatory and non-regulatory Special Use Airspace areas, as well as issued but not yet implemented amendments to those areas. FAA Order 7400.9 entitled "Airspace Designations and Reporting Points" provides a listing of terminal and enroute area designations and reporting points, as well as issued but not yet implemented amendments to those areas. At the time of this writing, both Orders may be obtained from the FAA on the Internet. As embodied herein, airspace includes, but is not limited to, any airspace and category of airspace established by an aviation regulatory authority or organization including the airspace and categories of airspace described in FAA Orders 7400.8 and 7400.9. As further embodied herein, an airspace database 135 includes, but is not limited to, data representative of the defined vertical and horizontal limits of any airspace; the time and day or days in which such airspace is in effect could also be included in an airspace database 135.

A terrain data source 140 comprises those sources that may provide data representative of the terrain, obstacles, or both. Obstacles may include, but are not limited to, towers, buildings, poles, wires, other manmade structures, foliage, and aircraft. It should be noted that although the discussion herein may discuss terrain and aspects of terrain avoidance, the embodiments herein apply equally to obstacles and obstacle avoidance. A terrain data source may include, but is not limited to, a terrain database 142 and radar system 144.

A terrain database 142 may be used to store terrain data contained in digital elevation models ("DEM"). Generally, the terrain data of a DEM is stored as grids, and each grid represents an area of terrain. A grid is commonly referred to as a terrain cell. A grid may be of various shapes. For example, a grid may be a cell defined in arc-seconds of latitude and longitude, or a grid may be rectangular, square, hexagonai, or circuiar. A grid may also be of differing resolutions. For instance, the U.S. Geological Society developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data. Various vendors and designers of avionics equipment have developed databases that have been, for all intents and purposes, proprietary in nature.

Data contained in a terrain data cell may include the value of the highest elevation found within the cell. In an embodiment herein, a terrain database 142 could contain a plurality of terrain cells, each having a value of the highest elevation found within the cell. Data contained in a terrain database 142 could be provided to a TA processor 190 for determination of a surface representative of terrain elevation and/or for determination of a terrain clearance surface. In one embodiment, data contained in a terrain database 142 could be representative of a terrain surface. In another embodiment, a terrain database 142 may be comprised of one or more databases, where each database could include data representative of one or more terrain clearance surfaces, where each terrain clearance surface could correspond to a specific phase of flight and flight attitude.

A radar system 144 may be employed to develop data representative of the terrain. An example of a radar system 144 used as a basis for a TAWS (or a terrain avoidance system) is described in U.S. patent application Ser. No. 11/904,491 which is incorporated by reference to the extent that it teaches the acquisition of terrain data by a radar system. In a radar system, a transceiver could transmit radio waves into the atmosphere via an antenna which, in turn, produces a focused beam. The transceiver may control the direction of the beam by steering the antenna horizontally and vertically. When the signal strikes or reflects off an object such as terrain or an obstacle, part of the radio wave energy is reflected back and received by the antenna. The range of the object may be determined by the transceiver by measuring the elapsed time between the transmission and reception of the signal. The azimuth of the terrain or obstacle may be determined as the angle to which the antenna was steered in the horizontal direction relative to the longitudinal axis of the aircraft during the transmission/reception of the signal. The elevation or elevation angle of the terrain or obstacle may be determined as the angle to which the antenna was steered in the vertical direction relative to the longitudinal axis of the aircraft during the transmission/reception of the signal. As embodied herein, terrain data and obstacle data acquired by a radar system and data representative of altitude 114 or height could be provided to a TA processor 190 for determination of a surface representative of terrain elevation. In another embodiment, the terrain data provided by a radar system 144 could be used in conjunction with a terrain database 142, an example of which is described in U.S. patent application Ser. No. 11/904,491 which is incorporated by reference to the extent that it teaches such use. In another embodiment, the acquisition of such terrain data could be limited or bounded in the lateral direction (i.e., the direction of the horizontal scan).

Input factors 150 are determining factors which may be used to define, in part, an alert surface, a clearance surface, or both as disclosed below in detail. Input factors 150 are determining factors which may be used as input for at least one criterion used in the definition of an alert surface, a clearance surface, of both. Input factors 150 may be provided by a plurality of aircraft system or component thereof. Input factors 150 may include real-time system or sensor data, signal input from a plurality of aircraft systems or sensors, and information from any data base or source. As embodied herein, an input factor 150 could provide data or a signal of any form containing information that may be provided to and received by a TA processor 190.

As embodied herein, input factors 150 include those inputs defined above as being part of the navigation system 110 (e.g., geographic position 112, attitude 114, speed 118, vertical speed 120, heading 122, radio altitude 124, day/date/time 126, and navigation data quality 128). Moreover, any input provided by a navigation system 110 could be considered an input factor for the purposes of the embodiments herein. In other words, a navigation system 110 may be considered as providing a subset of input factors 150. The presentation of the specific inputs from navigation system 110 should not be construed as an exclusion or limitation to input factors 150. As embodied herein, input factors 150 may include information from any data or information source available to the TA processor 190 including, but not limited to, an airport database 130, an airspace database 135, and a terrain data source 140. In other words, an airport database 130, an airspace database 135, and a terrain data source 140 may be considered as sources providing a subset of input factors 150. The presentation of specific databases should not be construed as an exclusion or limitation to input factors 150.

In an embodiment herein, inputs factors 150 may be selected a manufacturer or end-user as a determining factor for one or more criteria used in an equation which could be employed in the definition of an alert surface. As embodied herein, a maneuver profile could provide the basis of an alert surface including, but not limited to, an aircraft terrain alert surface and an aircraft airspace alert surface. A maneuver profile may be defined by an equation containing one or more selected criteria, each of which may comprise one or more input factors 150.

In another embodiment herein, inputs factors 150 may be selected a manufacturer or end-user as a determining factor for one or more criteria used in an equation which could be employed in the definition of a clearance surface. As embodied herein, a clearance distance could provide the basis of a clearance surface including, but not limited to, a terrain clearance surface and an airspace clearance surface. Additionally, a clearance distance could be applied to an aircraft terrain alert surface and aircraft airspace alert surface. A clearance distance may be defined by an equation containing one or more selected criteria, each of which may comprise one or more input factors 150.

When included in an equation, data representative of input factors 150 may be acquired by or through aircraft systems and sensors as discussed above and be provided as input to a TA processor 190. When received, the TA processor 190 may process the data in accordance with an avoidance maneuver algorithm that contains the equation or equations defining a maneuver profile and terrain clearance distance. As a result, the TA processor 190 may determine a unique alert surface, clearance surface, or both based upon the application of the real-time dynamic or static input factors 150.

One or more maneuver profiles may be defined using one or more selected criteria, each of which may be dependent on one or more input factors 150. The application of such criteria and input factors 150 by a TA processor 190 may determine an alert surface that represents real-time predictable and achievable aircraft performance using input factors 150. Although a manufacturer or end-user may define a maneuver profile using one criterion such as a constant climb gradient (as will be discussed below in detail) that may be independent of input factors 150, the advantages and benefits of the embodiments herein exploit the ability of a TA processor 190 to receive a plurality of available input factors 150, apply them to a maneuver profile defined and contained in an algorithm, and determine an alert surface unique to actual conditions of flight operations as measured by the values of the input factors 150. The advantages and embodiments disclosed herein apply equally to the formation of a clearance surface.

To provide a simple example of how input factors 150 may be used in the embodiments herein, suppose a maneuver profile is defined with criteria comprising an aircraft's maximum rate of climb or angle of climb over a given horizontal distance. Those skilled in the art understand that this climb performance may be affected by a plurality of factors including, but not limited to, altitude, attitude, temperature, aircraft speed, and winds aloft. Here, determining factors representing altitude 114, attitude 116, speed 118, temperature 152, and winds aloft 154 may be provided as input factors 150 to TA processor 190 for subsequent processing in accordance with the criteria that defines the maneuver profile. Because altitude 114 and temperature 152 could affect climb performance, speed 118 could affect any maneuver designed for transition to best rate of climb or angle of climb speed, and winds aloft 154 and speed 118 could affect the horizontal distance over which the climb performance may be achieved, a TA processor 190 is able to define and project a unique alert surface in front of the aircraft that is real-time because it is based upon input factors 150. As will be discussed below in detail, if an alert surface is penetrated by a terrain clearance surface (which the TA processor 190 has defined based upon, in part or in whole, data provided by a terrain data source 140), then the processor may generate an alert signal and provide such signal to a crew alerting system 195.

In the following paragraphs, other examples of criteria and performance factors are provided to illustrate the ability with which a manufacturer or end-user may define a maneuver profile as embodied herein. These illustrations are intended to provide exemplary criteria and performance factors that may be used in a terrain avoidance system 100, and are not intended to provide a limitation to the embodiments discussed herein in any way, shape, or form.

In one example, a maneuver profile could include meteorological or environmental criteria including, but not limited to, air density 184 and winds aloft 154 factors, where air density 184 may determined by such factors as altitude 114, temperature 152, barometric pressure 156, and dew point 158, and winds aloft 154 may determined by such factors as wind direction 160 and wind speed 162. As noted above, input factors 150 may include some of those inputs provided to a TA processor 190 by a navigation system 110, even though they are not enumerated under item 150 of FIG. 1; input factors that could affect the performance of the aircraft may include some inputs that are provided by any aircraft system other than a navigation system 110. As embodied herein, one or more input factors 150 could be included in the computation of another input factor. For instance, winds aloft 154 could have been considered in a computation of speed 118, and barometric pressure 156 could have been considered in a computation of altitude 114. In such instances, a TA processor 190 may be programmed to accept only one of these factors.

In another example, a maneuver profile could include criteria related to determination of day and night. If so, input factors could include, but are not limited to, geographic position 112 and day/date/time 126. In another example, a maneuver profile could include weight and balance criteria. If so, input factors 150 could include, but are not limited to, data representative of aircraft empty weight 164, center of gravity ("CG") 166, weight of fuel 170, and weight of cargo 172. In another example, a maneuver profile could include aircraft configuration and system criteria. If so, input factors 150 could include, but are not limited to, data representative of an aircraft's flap and slat 174, speed brake 176, and landing gear 178 configurations. In another example, a maneuver profile could include engine performance criteria. If so, input factors 150 could include, but are not limited to, data representative of engine performance or status 180 or available thrust. In another example, a maneuver profile could include traffic information criteria associated with systems such as, but not limited to, Automatic Dependent Surveillance-Broadcast (ADS-B), Automatic Dependent Surveillance-Rebroadcast (ADS-R), Traffic Information Services-Broadcast (TIS-B), Aircraft Collision Avoidance System (ACAS), or other sensors such as radar, forward looking infrared (FLIR), and camera. If so, input factors 150 could include, but are not limited to, data representative of traffic location, direction of flight, and speed 182.

In another example, a maneuver profile could include criteria related to phase of flight and flight attitude which are discussed below in detail. In another example, a maneuver profile could include criteria related to a specific maneuver or flight profile. If so, input factors could include, but are not limited to, data representative of a standardized arrival and departure procedure, an instrument approach procedure, a missed approach procedure, and a special operational approach procedure such as an RNP approach, each of which could be provided to a TA processor 190 from data provided by a navigation system 110. In another example, a maneuver profile could include criteria related to the type of threat which could be encountered by the aircraft. If so, input factors could include, but are not limited to, data representative of airspace, terrain, and obstacles, each of which could be provided to a TA processor 190 from data provided by an airspace database 135 and/or a terrain data source 140.

In another example, a maneuver profile could include criteria related to limiting the vertical or the horizontal distances of the profile. If so, input factors 150 could include, but are not limited to, data representative of the absolute ceiling of the aircraft (which may be provided as a constant which could be a constant offset by other criteria discussed above which could affect aircraft climb performance), distance to an airport of intended landing, or speed 118 which could be derived by a TA processor 190 from data provided by a navigation system 110 and airport database 130.

A TA processor 190 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. A TA processor 190 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units. As embodied herein, a TA processor 190 could be a processor(s) used by or in conjunction with any other system of the aircraft including, but not limited to, a processor(s) associated with a flight management computing system, an aircraft collision avoidance system, an AAWS, a terrain awareness and warning system, or any combination thereof.

A TA processor 190 may receive input data from various systems including, but not limited to, navigation system 110, an airport database 130, an airspace database 195, a terrain data source 140, and maneuver profile input factors 150. A TA processor 190 may be electronically coupled to a navigation system 110, an airport database 130, an airspace database 135, a terrain data source 140, and maneuver profile input factors 150 to facilitate the receipt of input data. It is not necessary that a direct connection be made; instead, such receipt of input data could be provided through a data bus or through a wireless network.

A crew alerting system 195 includes those systems that provide, in part, aural, visual, and/or tactile stimulus presented to attract attention and convey information regarding system status or condition. A crew alerting system 195 may include, but is not limited to, an aural alert unit for producing aural alerts, a display unit for producing visual alerts, and a tactile unit for producing tactile alerts. Aural alerts may be discrete sounds, tones, or verbal statements used to annunciate a condition, situation, or event. Visual alerts may be information that is projected or displayed on a cockpit display unit to present a condition, situation, or event to the pilot. Tactile alerts may be any tactile stimulus to present a condition, situation, or event to the pilot. In addition, alerts may be based on conditions requiring immediate crew awareness or attention. Caution alerts may be alerts requiring immediate crew awareness in which subsequent corrective action will normally be necessary. Warning alerts may be alerts for detecting terrain threat that requires immediate crew action. Both caution and warning alerts may be presented as aural alerts, visual alerts, tactile alerts, or in any combination thereof. When presented visually, one or more colors may be presented on a display unit indicating one or more levels of alerts. For instance, amber or yellow may indicate a caution alert and red may indicate a warning alert.

In one embodiment, an aural alert could call out "caution, terrain" when the conditions for a caution alert have been met or "warning, terrain" when the conditions for a warning alert have been met. In another embodiment, a visual message could display "caution, terrain" text when the conditions for a caution alert have been met or "warning, terrain" text when the conditions for a warning alert have been met. In another embodiment, a text message could be displayed in color, e.g., the "caution, terrain" text could be displayed in amber and the "warning, terrain" could be displayed in red. In another embodiment, the terrain that is causing the alert could be indicated visually, aurally, and/or tactilely, in any combination. In another embodiment, the aural and visual alerts could be presented simultaneously. In another embodiment, the alert could be issued along with one or more recommendations and/or guidance information for responding to the alert condition including, for example, the audio and/or visual indication of "Warning, terrain. Pull-up and turn left."

Figure 2A:
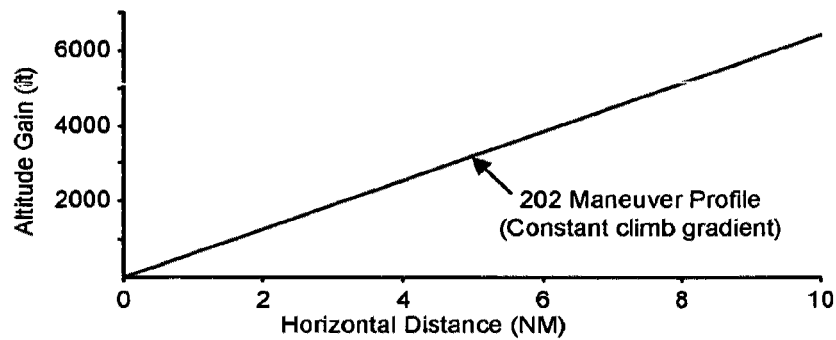
FIGS. 2A-2F provide exemplary depictions of vertical terrain maneuver profiles and terrain alert surfaces of an aircraft in level flight.
Figure 2B:
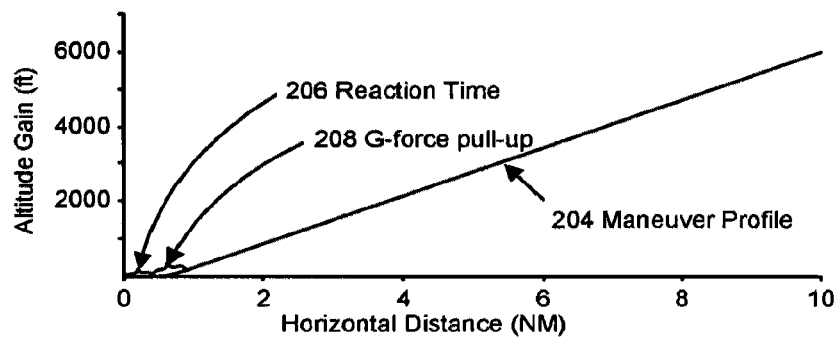
Figure 2C:
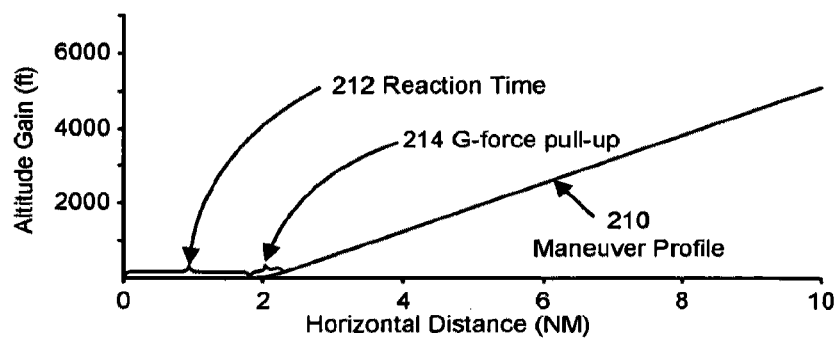

The advantages and benefits of the embodiments discussed herein may be illustrated by showing examples of using maneuver profiles and alert surfaces in a terrain awareness and warning system 100. The drawings of FIGS. 2A through 2C provide exemplary maneuver profiles which may serve as the basis for establishing alert surfaces. The drawings provide an example of a maneuver profile in a vertical direction that may be used for terrain avoidance, obstacle avoidance, or both. It should be noted that although the remainder of the discussion may illustrate terrain and discuss aspects of terrain avoidance, the embodiments herein apply equally to obstacles and obstacle avoidance.

FIG. 2A provides an illustration of a simple maneuver profile. Item 202 illustrates a maneuver profile defined as a constant climb gradient such as 6 degrees. When viewed in isolation, maneuver profile 202 is a simple profile comprising a single criterion independent of any input factor including altitude 114. Without an input factor, a maneuver profile 202 could be the same as an alerting surface.

In FIGS. 2B and 2C, maneuver profile 202 has been redefined by incorporating two criteria into each profile: pilot reaction time and a G-Force pull-up maneuver. As shown in FIGS. 2B and 2C, the maneuver profiles will shift to the right to accommodate a horizontal distance contributed by the addition of the two criteria. Because the magnitude of the distance of each criterion may be dependent on at least one input factor 150 such as speed 118, such factor could be provided as an input to the TA processor 190 for the computation and definition of an alert surface.

In FIG. 2B, maneuver profile 204 includes a pilot reaction time 206 of 3 seconds and a G-force pull-up maneuver 208 of 0.25 g, where g is the value of the acceleration of gravity which is nominally approximately 32.2 feet per second squared ($ft/s^2$) on earth. In FIG. 2C, maneuver profile 210 includes a pilot reaction time 212 of 13 seconds and a G-force pull-up maneuver 214 of 0.25 g. As embodied herein, the inclusion of criteria such as pilot reaction time and G-force pull-up maneuver in maneuver profiles 204 and 210 could be selected by a manufacturer or an end-user. It should be noted that the values 3 and 13 seconds, 0.25 g, and 10 nautical miles (NM) have been selected for the sole purpose of illustration and do not establish a limit to the embodiments herein.

Figure 2D:
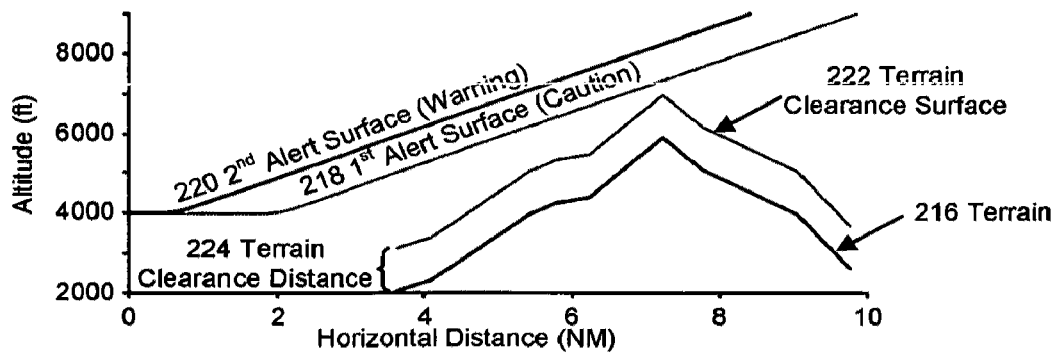
Figure 2E:
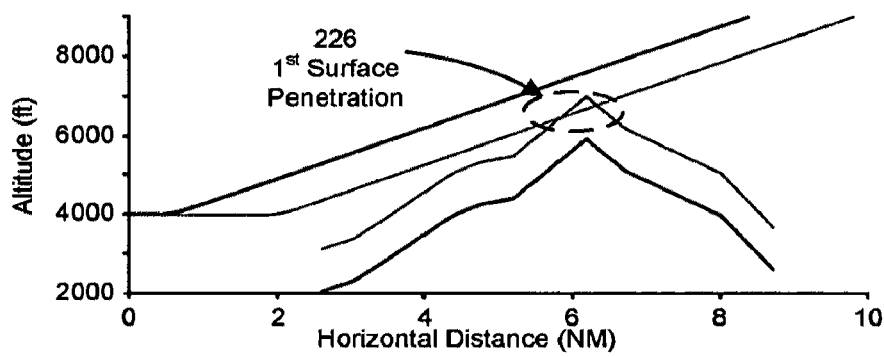
Figure 2F:
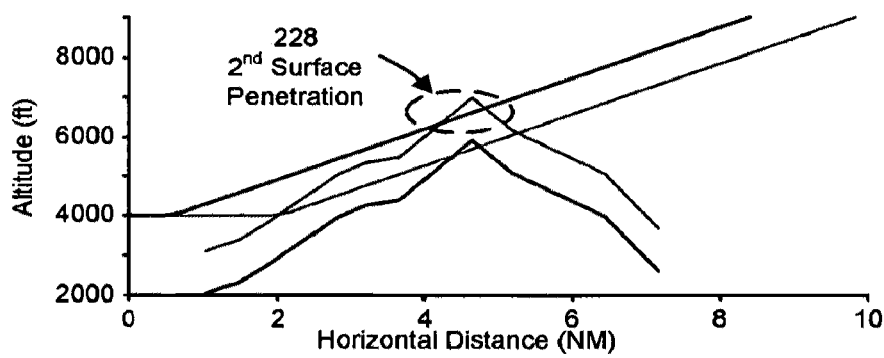

FIGS. 2D through 2F provide exemplary projections of two alerting surfaces of an aircraft operating at 4,000 feet in level flight and 500 knots which could be represented by such input factors as altitude 114, attitude 116, and speed 118. As shown, the aircraft approaching a hilly or mountainous terrain 216 of higher altitude along its projected flight path. As embodied herein, only one alerting surface may be sufficient for a generation of an alert signal by a TA processor 190 and for the receiving of such signal by a crew alerting system 195. A first alert surface 218 is based upon maneuver profile 210, and a second alert surface 220 is based upon maneuver profile 204. As shown in FIG. 2D, a first alert surface 218 could be associated with a caution-type alert, and as discussed above, a caution alert may require immediate crew awareness and subsequent corrective action. Likewise, a second alert surface 220 could be associated with a warning-type alert, and as discussed above, a warning alert may require immediate crew awareness and immediate crew action.

Terrain 216 of FIGS. 2D through 2F (which may include terrain, obstacles, or both as discussed herein) comprises of a surface representative of the elevation corresponding to the Earth's surface that could be provided by a terrain data source 140. In an embodiment herein, terrain data could be provided by a terrain database 142. In another embodiment, terrain data could be provided by a radar system 144. In another embodiment, terrain data could be provided by both a terrain database 142 and a radar system 144.

FIGS. 2D through 2F provide an exemplary depiction of a terrain clearance surface 222 that may be projected vertically above terrain 216 at a terrain clearance distance 224 to provide vertical separation. Although not depicted, a terrain clearance surface could also be projected horizontally at a clearance distance to provide horizontal separation. As embodied herein, a terrain clearance distance 224 is optional and does not have to be employed. If not employed, a terrain clearance surface 222 could be considered the same as the terrain surface 216 or coinciding with the terrain surface 216, and receipt of terrain data could constitute the receipt of data representative of a terrain clearance surface 222. For example, a manufacturer or end-user could rely only on a maneuver profile(s) profiles that define an alert surface(s) to provide clearance. In another example, a terrain database 142 may include data representative of one or more terrain clearance surfaces, and the data provided could be based upon at least one input factor data 150. In such an example, data representative of airspace clearance surface(s) could be stored in a terrain database 142 corresponding to specific phases of flight, flight attitudes, or both as discussed below.

If employed, however, the value of a terrain clearance distance 224 may not remain constant between take-off and landing. Instead, the value of a terrain clearance distance 224 could depend on a plurality of operational criteria or other criteria. For example, a terrain clearance distance may be determined by input factors 150 used to determine the following criteria: phase of flight (e.g., terminal, approach, departure, and enroute), flight attitudes (e.g., level, descending, or climbing flight), or both. Input factors provided for these criteria could include geographic position 112, altitude 114, attitude 116, speed 118, vertical speed 120, and input from an airport database 130.

A terminal phase of flight could exist when the aircraft position is a pre-defined distance (e.g., 15 nautical miles) or less from the nearest runway while the range to the nearest runway threshold is decreasing and the aircraft is operating at or below (lower than) an upper terminal phase boundary altitude, where the value of the upper terminal phase boundary altitude varies as a function of height above runway and distance to the runway, which could be determined by the TA processor based upon navigation system 110 data and airport database 130. Generally, the terminal phase of flight ends where the approach phase begins.

An approach phase of flight could exist when the aircraft is a pre-defined distance (e.g., 5 nautical miles) or less to the nearest runway threshold, the height above the nearest runway threshold location and elevation is equal to or less than a pre-defined altitude (e.g., 1,900 feet), and distance to the nearest runway threshold is decreasing.

A departure phase of flight could exist if an aircraft is on the ground upon initial power-up. A reliable input factor or a combination of input factors may be used to determine whether or not the aircraft is on the ground. For example, one parameter which could initially determine the aircraft to be on the ground could be a signal generated by a weight-on-wheels switch 186 ("squat switch") to indicate whether or not the aircraft is on the ground. Another parameter could be the radio altitude 124. Other parameters such as speed 118, altitude 116, geometric position 112, and information contained in an airport database 130, airspace database 135, and/or a terrain data source 140 could be used to determine if the aircraft is on the ground or airborne. For example, an aircraft could be "on the ground" if it is operating at a speed less than 35 knots and altitude within +/−75 feet of field elevation or nearest runway elevation. Similarly, an aircraft could be "airborne" if it is operating at a speed greater than 50 knots and altitude 100 feet greater than field elevation; in this example, it can be reliably determined that the aircraft is operating in the departure phase of flight. Other parameters which may be considered are climb state and distance from departure runway. Once the aircraft reaches a pre-defined altitude (e.g., 1,500 feet above the departure runway), the departure phase could end.

An enroute phase of flight may exist anytime the aircraft is more than a pre-defined distance (e.g., 15 nautical miles) from the nearest airport or whenever the conditions for terminal, approach and departure phases of flight are not met.

As embodied herein, the value of a terrain clearance distance 224 may depend on a phase of flight and flight attitude. For example, if an aircraft is operating in the enroute phase of flight, a vertical terrain clearance distance 224 could be 700 feet when operating in a level flight attitude and 500 feet when operating in a descending flight attitude. In another example, if an aircraft is operating in the terminal phase of flight, a vertical terrain clearance distance 224 could be 350 feet when operating in a level flight attitude and 300 feet when operating in a descending flight attitude. In another example, if an aircraft is operating in the approach phase of flight, a vertical terrain clearance distance 224 could be 150 feet when operating in a level flight attitude and 100 feet when operating in a descending flight attitude. The value of a terrain clearance distance 224 may depend on the phase of flight and not flight attitude. For example, if an aircraft is operating in the departure phase of flight, a terrain clearance distance 224 could be set to one value (e.g., 100 feet) irrespective of flight attitude. It should also be noted that level flight attitude may or may not include aircraft operating at relatively low vertical speeds and the values may differ across the phases of flight. For example, an aircraft climbing or descending at a rate of 500 per minute or less may be considered as operating in level flight in one phase of flight but not in another.

Those skilled in the art will recognize the values used in the preceding examples are associated with some of the minimum performance standards of a TAWS published by the United States Federal Aviation Administration ("FAA") in a Technical Standard Order referred to as TSO-C151b. Although TSO-C151b states specific values of minimum terrain clearance distances, those skilled in the art will readily acknowledge that aviation regulatory authorities such as the FAA may modify minimum performance standards with subsequent changes, amendments, or revisions. In addition, other aviation regulatory authorities could develop separate minimum performance standards which differ from those published by the FAA. In addition, a manufacturer or end-user of an aircraft may decide to configure one or more of the parameters discussed above. The embodiments and discussion herein with respect to phases of flight and values of terrain clearance distances are illustrations intended solely to provide examples and are in no way intended to be limited to those discussed and presented herein. As embodied herein, the TA processor 190 may determine phase of flight, flight attitude, and terrain clearance distance data using algorithms programmed in executable software code. Those skilled in the art will appreciate the ability and ease with which executable software code may be reprogrammed or modified to facilitate subsequent or concurrent performance standards without affecting or expanding the scope of the embodiments discussed herein.

A manufacturer or end-user may select one or more alternative criteria. For example, an aircraft with poor climb performance may use different criteria in defining a terrain clearance surface, and input factors 150 associated with climb performance could be provided such as weight and balance criteria as discussed above. In another example, a reduced terrain clearance may be needed to accommodate user-specific operations. For instance, a specific maneuver or flight profile such as a precision approach that is coupled to an autoflight system (and not hand flown) may allow an aircraft to fly closer to a terrain or obstacle rather than a hand-flown, step-down approach; as such, criteria including inputs factors 150 of data representative of the precision approach or status of the autoflight system could be determining factors of a terrain clearance distance. In another example, helicopter operations could provide special operations that necessitate one or more criteria in determining a terrain clearance distance for obstacle (and terrain) avoidance. As embodied herein, aircraft includes any vehicle capable of controlled flight.

In another example, a maneuver profile could include criteria related to determination of day and night as discussed above. In another example, a terrain clearance distance could include meteorological or environmental criteria and associated input factors 150 as discussed above. In another example, a terrain clearance distance could include aircraft configuration and system criteria and associated input factors 150 as discussed above. In another example, a terrain clearance distance could include aircraft configuration and system criteria and associated input factors 150 as discussed above. In another example, a terrain clearance distance could include engine performance criteria and associated input factors 150 as discussed above. In another example, a terrain clearance distance could include engine performance criteria and associated input factors 150 as discussed above. In another example, a terrain clearance distance could include traffic information criteria associated with systems and associated input factors 150 as discussed above.

In the preceding paragraphs, the examples of criteria and performance factors are provided to illustrate the ability with which a manufacturer or end-user may define a terrain clearance distance as embodied herein. These illustrations are intended to provide exemplary criteria and performance factors that may be used in an airspace awareness warning system 100, and are not intended to provide a limitation to the embodiments discussed herein in any way, shape, or form.

FIGS. 2E and 2F provide exemplary depictions of events in which a terrain clearance surface 222 penetrates two alert surfaces as the aircraft approaches terrain 216, where each event triggers an alert being that may be provided to the pilot by a crew alerting system 195. In an embodiment of FIG. 2E, a first surface penetration 226 has occurred wherein the terrain clearance surface 222 has penetrated a first alert surface 218 as the aircraft approaches terrain 216. Because the first alert surface 218 is associated with a caution alert in this example as discussed above, a TA processor 190 could generate a caution alert signal and provide such signal to a crew alerting system 195 as a result of the penetration. As the aircraft continues to approach terrain 216 as shown in FIG. 2F, a second surface penetration 228 has occurred where the terrain clearance surface 222 has penetrated a second alert surface 220. Because the second alert surface 220 is associated with a warning signal as discussed above, the processor 190 could generate a warning signal and provide such signal to the crew alerting system 195 as a result of the penetration.

As shown above, a first alert surface 218 and a second alert surface 220 have been based upon maneuver profiles 210 and 204, respectively, where each has been based on maneuver profile 202 of a constant angle climb (e.g., six degrees) having a distance of 10 NM. As embodied herein and discussed above, however, the advantages of the embodiments herein may incorporate any profile which may be used or defined as a maneuver profile. A manufacturer or end-user of a TAWS 100 could establish or configure a plurality of maneuver profiles; on the other hand, a manufacturer or end-user of the aircraft may wish to provide a single maneuver profile under all conditions to simplify pilot training. As embodied herein, a maneuver profile may comprise of one or more vertical maneuvers, one or more horizontal maneuvers as discussed below in detail, or it may be a combination of one or more vertical and horizontal maneuvers.

The drawings of FIGS. 3A-3K provide top-down exemplary depictions of search volumes within which potentially hazardous terrain such as, for example, that terrain shown in FIGS. 2E through 2F that penetrated the alert surfaces 226 and 228, the triggering events that cause a TA processor 190 to generate and provide an alert signal to a crew alerting system 195 to alert the pilot. A search volume could be defined by a manufacturer or end-user and may include horizontal limits, vertical limits, or both, and may be applied in airspace avoidance applications as discussed below in detail. A few examples of such volumes include, but are not limited to, those depicted in FIGS. 3A through 3K. A search volume could comprise lateral limits (identified as "LL1" and "LL2") along a projected flight path (identified as "P"), a back limit (identified as "BL"), and a forward limit (identified as "FL") as shown in FIGS. 3A through 3K. These illustrations are intended to provide limits that may be used in a TAWS 100, and are not intended to provide a limitation to the embodiments discussed herein in anyway, shape, or form. Moreover, these illustrations could apply equally for airspace avoidance as discussed below in detail.

Figure 3A:
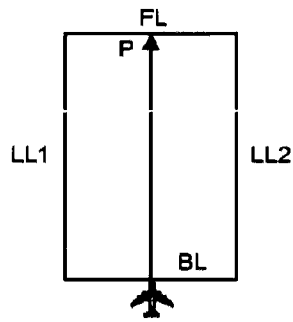
FIGS. 3A-3K provide top-down exemplary depictions of search volumes along projected flight paths.
Figure 3C:
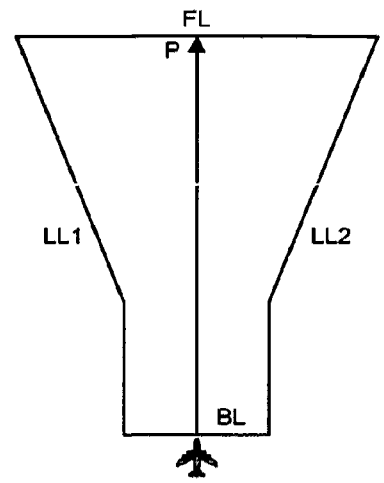
Figure 3B:
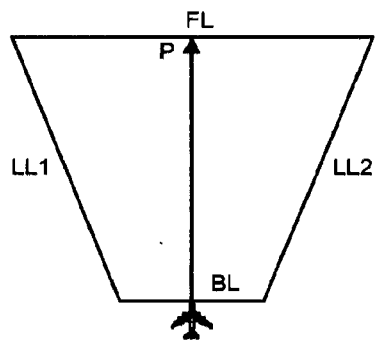
Figure 3E:
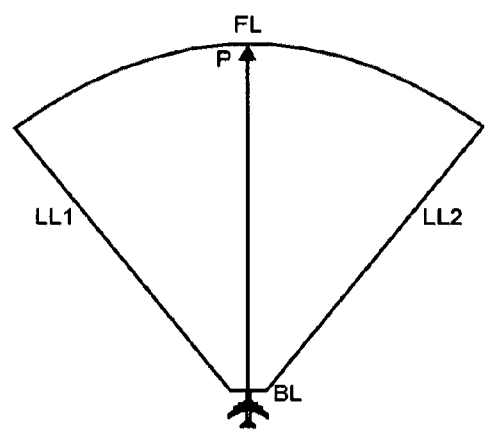
Figure 3D:
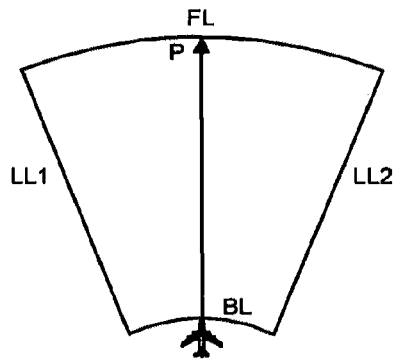
Figure 3F:
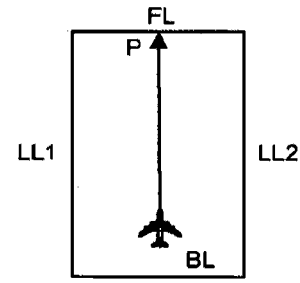
Figure 3G:
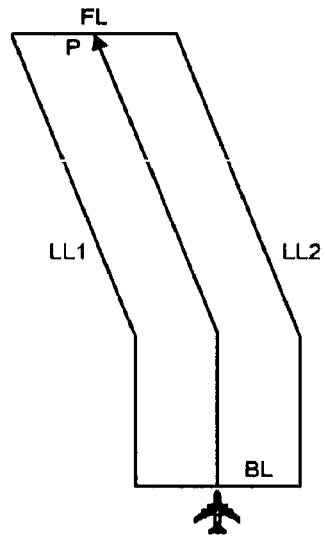
Figure 3H:
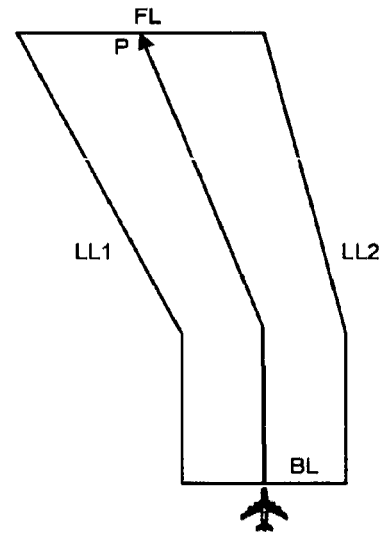
Figure 3I:
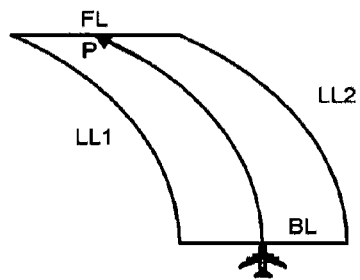
Figure 3J:
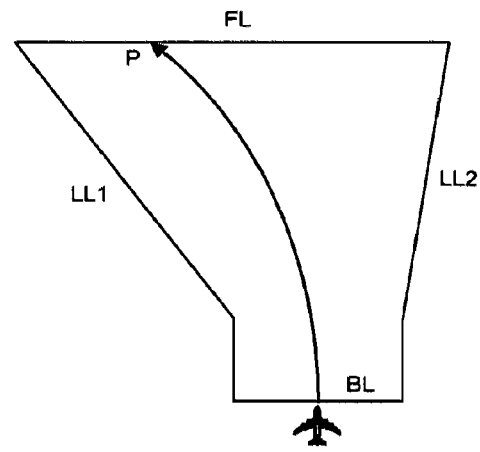
Figure 3K:
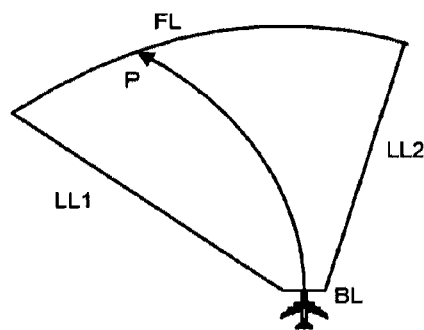

Lateral, forward, and back limits could be made a function of one or more of the same criteria and one or more input factors of a maneuver profile as discussed above. Forward and back limits may vary between lateral limits as shown in FIGS. 3A through 3C. In another example, a forward limit may remain constant by forming an arc between the lateral limits as shown in FIGS. 3D and 3E. In another example, the back limit may be established behind the aircraft position received from a navigation system 110 to accommodate uncertainty in the aircraft position as indicated by navigation data quality 128, and/or uncertainty in the airspace database 135 or terrain data source information 140 as shown in FIG. 3F. In another example, the back limit may be established in front of the aircraft current position. In another example, the lateral limits may be altered to accommodate a change in direction of a projected flight path as shown in FIGS. 3G and 3H. In another example, the lateral limits may be dynamic to accommodate turning flight; for instance, FIG. 3A could take the shape of FIG. 3I, FIG. 3C could take the form of FIG. 3J, and FIG. 3E could take the form of FIG. 3K during turning flight. Vertical limits of a search volume may include that terrain which is at or above a terrain clearing surface such as the terrain clearance surface 222 depicted in FIGS. 2D through 2F.

Figure 4A:
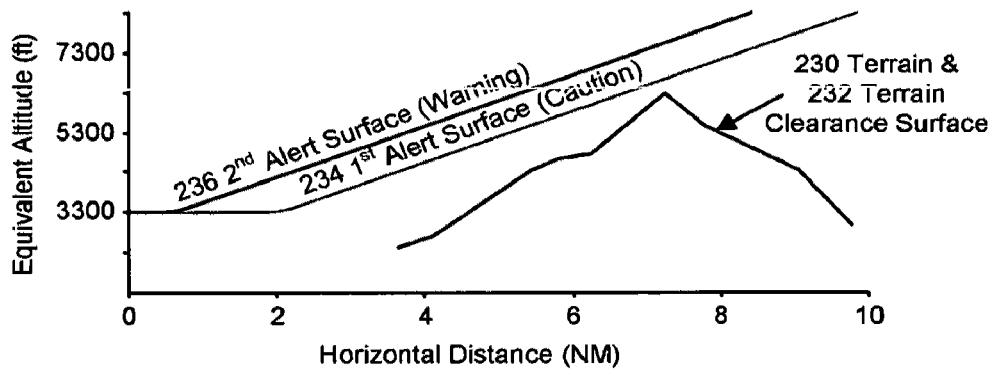
FIGS. 4A-4C provide exemplary depictions of vertical terrain maneuver profiles and terrain alert surfaces of an aircraft in level flight where the terrain and terrain clearance surfaces coincide.
Figure 4B:
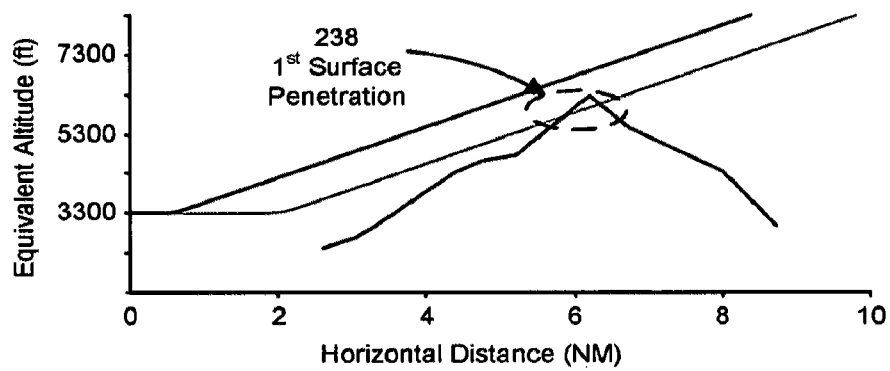
Figure 4C:
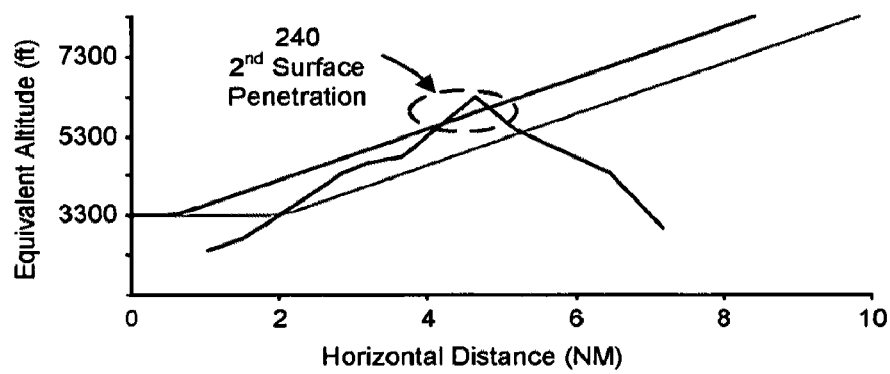

FIGS. 4A through 4C provide exemplary projections of two alert surfaces based upon the two maneuver profiles 204 and 210 of FIGS. 2B and 2C. In the embodiments of FIGS. 4A through 4C, terrain 230 and terrain clearance surface 232 coincide as depicted in FIG. 4A, which is an advantage of this embodiment because a terrain clearance distance 224 (e.g., FIG. 2D) may be omitted from the computation of a terrain clearance surface. In those embodiments where terrain and terrain clearance surface coincide, these terms may be used interchangeably. One exemplary manner to take advantage of this embodiment is to project each alert surface to an equivalent altitude that is offset by the value of the vertical terrain clearance distance 224 while the alert surface remains based upon an input factor altitude 114. As previously stated, an aircraft operating in level flight in the enroute phase of flight may have a vertical terrain clearance distance 224 of 700 feet. Because a vertical terrain clearance distance 224 is also the value of the offset, the alert surfaces may be projected from the aircraft altitude of 4,000 feet down to an equivalent altitude of 3,300 feet for this exemplary 700 feet vertical terrain clearance distance 224 as shown in FIGS. 4A through 4C.

FIGS. 4B and 4C provide exemplary depictions of events in which a terrain clearance surface 232 penetrates two alert surfaces as the aircraft approaches terrain 230, where each event triggers an alert being that may be provided to the pilot by a crew alerting system 195. In an embodiment of FIG. 4B, a first surface penetration 238 has occurred where the terrain clearance surface 232 has penetrated a first alert surface 234 as the aircraft approaches terrain 230. Because the first alert surface 234 is associated with a caution alert in this example as discussed above, a TA processor 190 could generate a caution alert signal and provide such signal to a crew alerting system 195 as a result of the penetration. As the aircraft continues to approach terrain 230 as shown in FIG. 4C, a second surface penetration 240 has occurred where the terrain clearance surface 232 has penetrated a second alert surface 236. Because the second alert surface 236 is associated with a warning signal as discussed above, the processor 190 could generate a warning signal and provide such signal to the crew alerting system 195 as a result of the penetration. It should be noted that the embodiments of FIGS. 4A through 4C may be applied for any alert surface and is not limited to the alert surfaces, phase of flight, or flight attitude depicted therein.

Figure 5A:
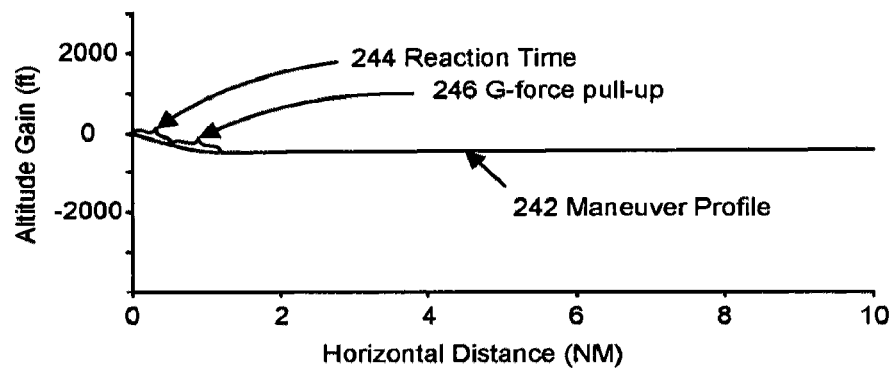
FIGS. 5A-5E provide exemplary depictions of vertical terrain maneuver profiles and terrain alert surfaces of an aircraft in descending flight.
Figure 5B:
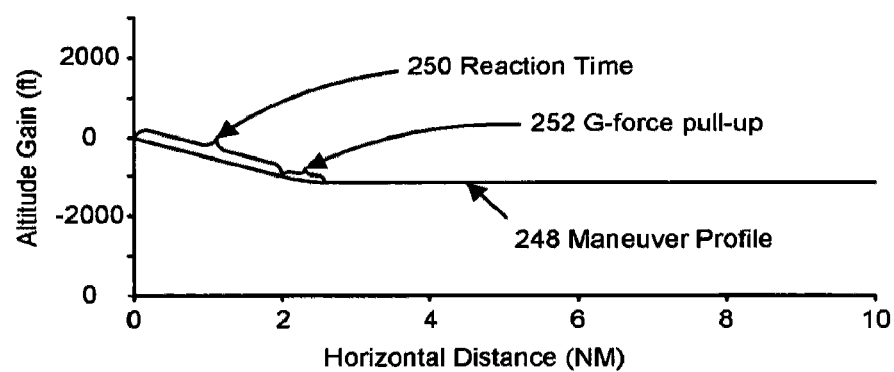

FIGS. 5A and 5B provide exemplary maneuver profiles which may serve as the basis for establishing alert surfaces. In FIGS. 5A and 5B, maneuver profiles 242 and 248 have been defined by incorporating two criteria into each profile: pilot reaction time and a G-Force pull-up maneuver. Additional criteria could include attitude 116 and vertical speed 120, or a phase of flight and flight attitude parameter based upon aircraft-related data provided by an airport database 130 and attitude 116. As these additional criteria demonstrate and as embodied herein, input factors 150 could comprise of alternative sources or a combination of other input factors for any profile of which a manufacturer or end-user may define. As shown in FIGS. 5A and 5B, the maneuver profiles have shifted to the right to accommodate a horizontal distance contributed by the addition of the two criteria. Because the magnitude of the distance of each criterion may be dependent on at least one input factor such as speed 118, such factor could be provided as an input to the TA processor 190 for the computation and definition of an alert surface.

Maneuver profile 242 of FIG. 5A includes a pilot reaction time 244 of 3 seconds and a G-force pull-up maneuver 246 of 0.25 g. Maneuver profile 248 of FIG. 5B includes a pilot reaction time 250 of 13 seconds and a G-force pull-up maneuver 252 of 0.25 g. It should be noted that the values of 3 and 13 seconds for the pilot reaction times 244 and 250, 0.25 g for the G-force pull-up maneuvers 246 and 252, and 10 NM for horizontal distance have been selected for the sole purpose of illustration and do not establish a limit to the embodiments herein.

Figure 5C:
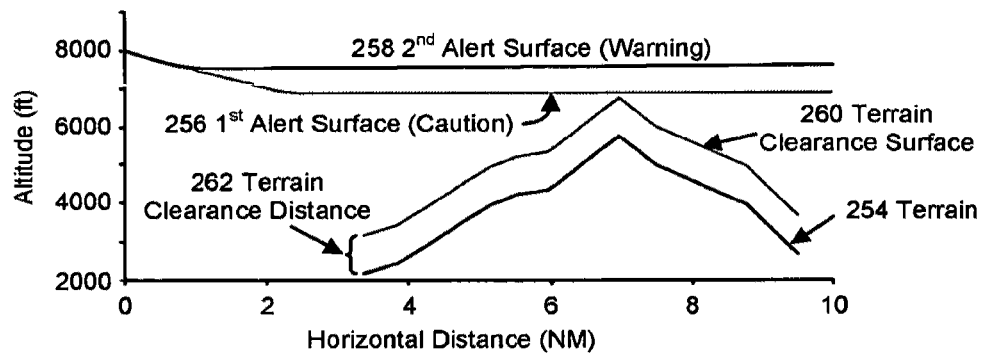
Figure 5D:
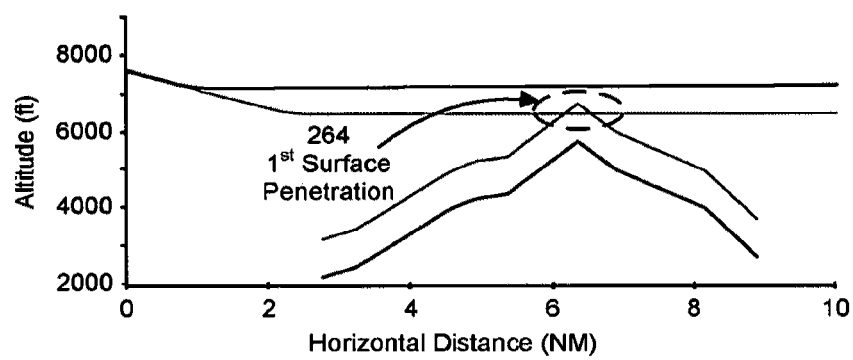
Figure 5E:
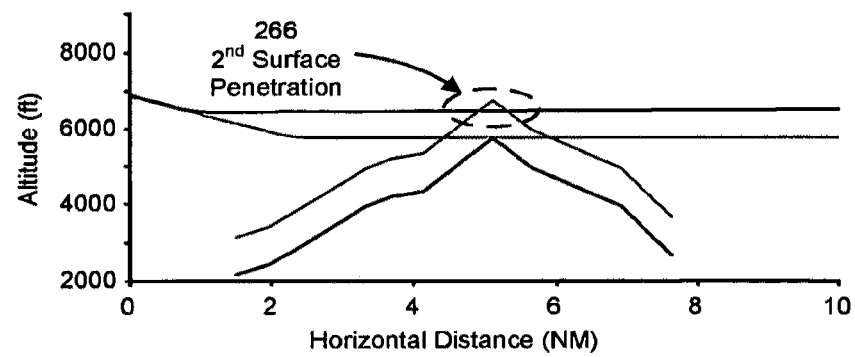

FIGS. 5C through 5E provide exemplary projections of two alerting surfaces 256 and 258 of an aircraft descending through 6,000 feet which could include input factors of attitude 116 and altitude 114. As shown, the aircraft is approaching a hilly or mountainous terrain 254 along its projected flight path. A first alert surface 256 is based upon maneuver profile 248, and a second alert surface 258 is based upon maneuver profile 242. As shown in FIG. 5C, a first alert surface 256 could be associated with a caution-type alert, and a second alert surface 258 could be associated with a warning-type alert.

FIGS. 5C through 5E depict of a terrain clearance surface 260 that may be projected above terrain 254 at a terrain clearance distance 262. FIGS. 5D and 5E provide exemplary depictions of events in which a terrain clearance surface 260 penetrates two alert surfaces as the aircraft approaches terrain 254, where each event triggers an alert that may be provided to the pilot by a crew alerting system 195. In an embodiment of FIG. 5D, a first surface penetration 264 has occurred where the terrain clearance surface 260 has penetrated a first alert surface 256 as the aircraft approaches terrain 254. Because the first alert surface 256 is associated with a caution alert in this example as discussed above, a TA processor 190 could generate a caution alert signal and provide such signal to a crew alerting system 195 as a result of the penetration. In an embodiment of FIG. 5E, a second surface penetration 266 has occurred where the terrain clearance surface 260 has penetrated a second alert surface 258. Because the second alert surface 258 is associated with a warning signal as discussed above, the processor 190 could generate a warning signal and provide such signal to the crew alerting system 195 as a result of the penetration. Although not shown, a terrain clearance surface 260 could have been projected horizontally at the same or a different clearance distance to provide horizontal separation as discussed above.

It should be noted that, although the alert surfaces 256 and 258 depict an aircraft approaching an upward sloping terrain 254, the embodiments therein could be applied to the downward sloping terrain 254. A first surface penetration could occur if a first alert surface 256 penetrates a portion of a terrain clearance surface 260 that is downward sloping, and a second surface penetration could occur if a second alert surface 258 penetrates that portion of a terrain clearance surface 260 that is downward sloping.

Figure 6A:
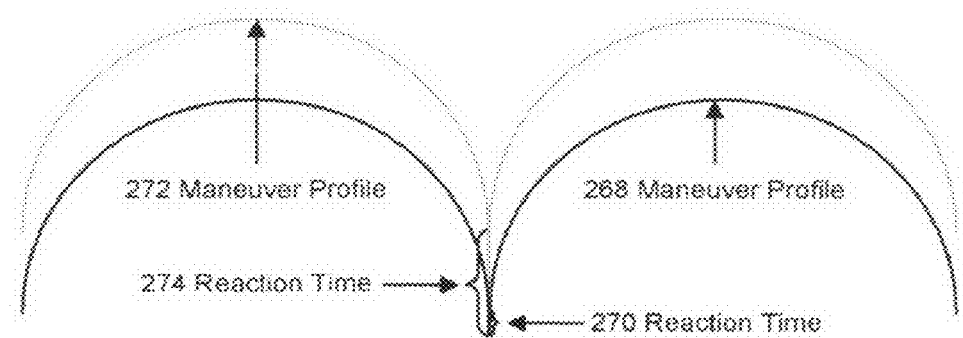
FIGS. 6A-6D provide exemplary depictions of horizontal terrain maneuver profiles and terrain alert surfaces of an aircraft in flight.

FIG. 6A provides exemplary maneuver profiles which may serve as the basis for establishing alert surfaces. In FIG. 6A, maneuver profiles 268 and 272 have been defined by incorporating two criteria into each profile: a constant radius turn and pilot reaction time. As shown in FIG. 6A, the maneuver profiles have shifted forward to accommodate a horizontal distance contributed by the addition of the two criteria. Because the magnitude of the distance of the criteria may be dependent on at least two input factors such as attitude 116 and speed 118, such factors could be provided as input factors to the TA processor 190 for the computation and definition of an alert surface.

Maneuver profile 268 includes a pilot reaction time 270 of 3 seconds, and maneuver profile 272 includes a pilot reaction time 274 of 13 seconds. In an embodiment, the inclusion of a pilot reaction time and the exclusion of a G-force pull-up maneuver, for instance, could be selected by a manufacturer or an end-user of a TAWS 100. It should be noted that the values of 3 and 13 seconds for the pilot reaction times 270 and 274 have been selected for the sole purpose of illustration and do not establish a limit to the embodiments herein.

Figure 6B:
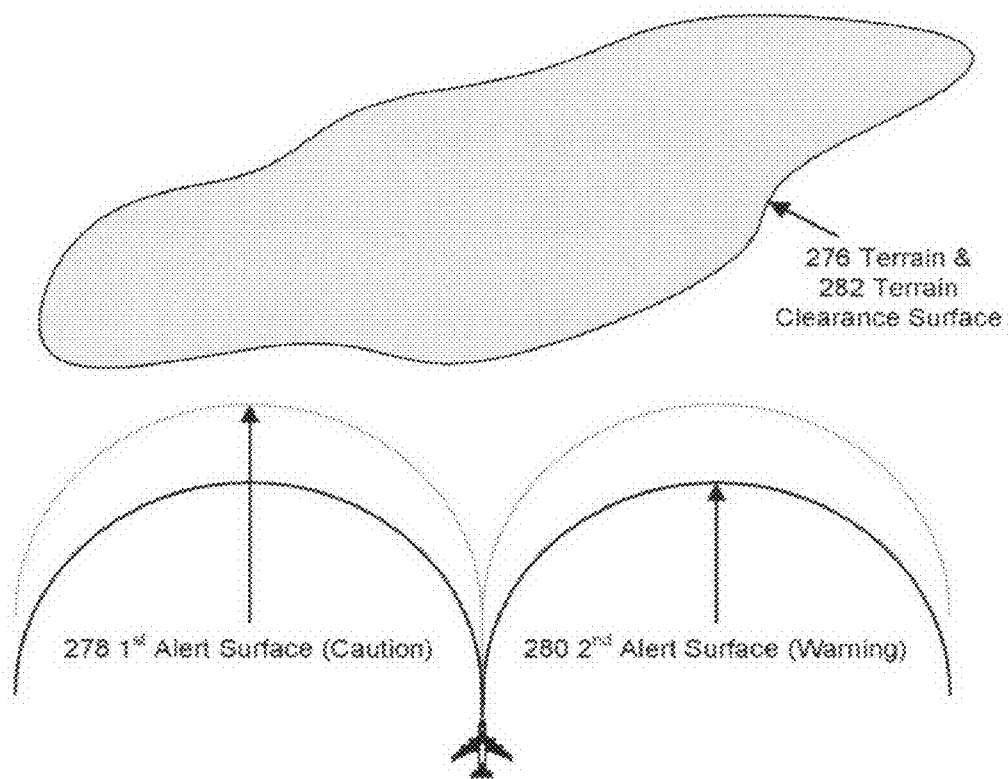
Figure 6C:
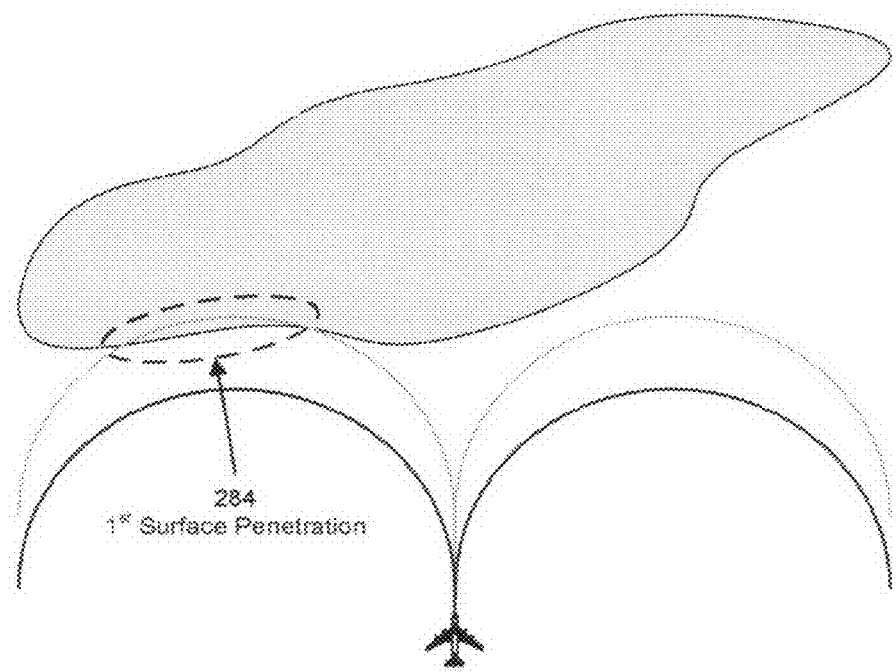
Figure 6D:
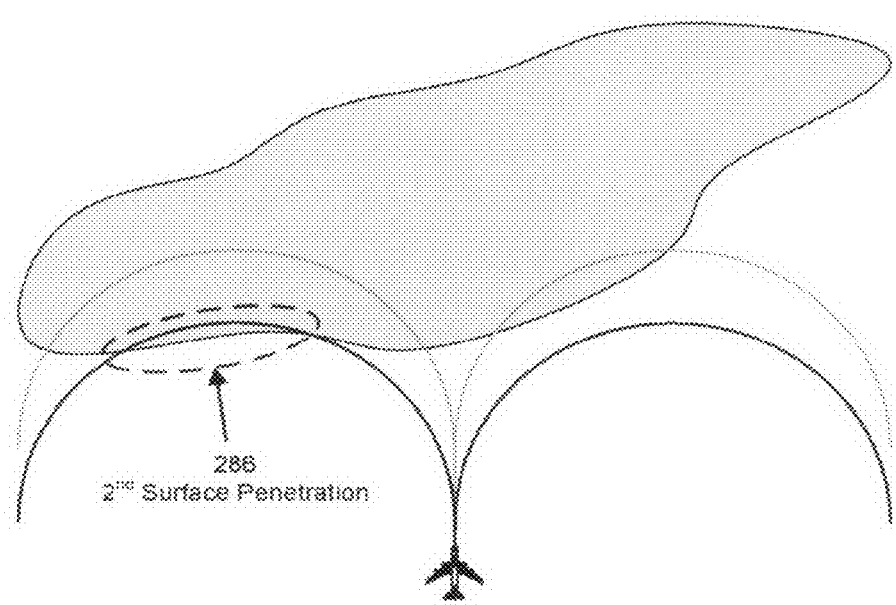

FIGS. 6B through 6D provide an exemplary depiction of an aircraft having two alerting surfaces based upon maneuver profiles 268 and 272 and approaching terrain 276 along its projected flight path. A first alert surface 278 is based upon maneuver profile 272, and a second alert surface 280 is based upon maneuver profile 268. As shown in FIG. 6B, a first alert surface 278 could be associated with a caution-type alert, and a second alert surface 280 could be associated with a warning-type alert.

FIGS. 6B through 6D depict a terrain clearance surface 282 that may be projected above terrain 276 at a terrain clearance distance (e.g., items 224 and 262). When viewed from above, the terrain clearance surface 282 coincides with terrain 276. Although not shown, a terrain clearance surface 282 could have been projected horizontally at the same or a different clearance distance to provide horizontal separation as discussed above. FIGS. 6C and 6D provide exemplary depictions of events in which a terrain clearance surface 282 penetrates two alert surfaces as the aircraft approaches terrain 276, where each event triggers an alert that may be provided to the pilot by a crew alerting system 195. In an embodiment of FIG. 6C, a first surface penetration 284 has occurred where the terrain clearance surface 282 has penetrated a first alert surface 278 as the aircraft approaches terrain 276. Because the first alert surface 278 is associated with a caution alert in this example as discussed above, a TA processor 190 could generate a caution alert signal and provide such signal to a crew alerting system 195 as a result of the penetration. As the aircraft continues to approach terrain 276 as shown in FIG. 6D, a second surface penetration 286 has occurred where the terrain clearance surface 282 has penetrated a second alert surface 280. Because the second alert surface 280 is associated with a warning signal as discussed above, the processor 190 could generate a warning signal and provide such signal to the crew alerting system 195 as a result of the penetration.

It should be noted that the penetration of the first alert surface 278 occurred on the left side of the aircraft before it occurred on the right side. Such an occasion—penetration to one side and not the other—could provide a separate or an additional basis used in a terrain awareness and warning system for providing lateral guidance. For example, U.S. Pat. No. 8,019,491 discloses such a system in which lateral guidance is provided.

Figure 7A:
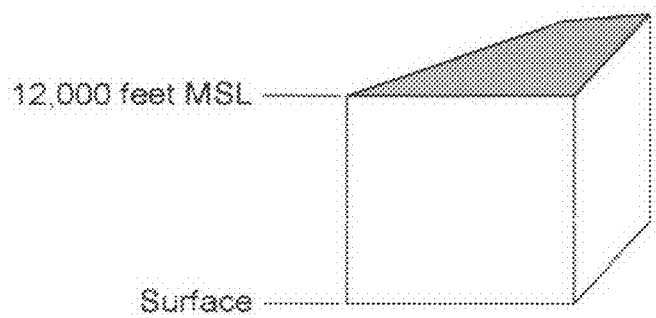
FIGS. 7A-7B provide exemplary depictions of an airspace to illustrate vertical or perimeter surface(s) and ceiling of an airspace as described by delineated horizontal limits and designated altitudes.
Figure 7B:
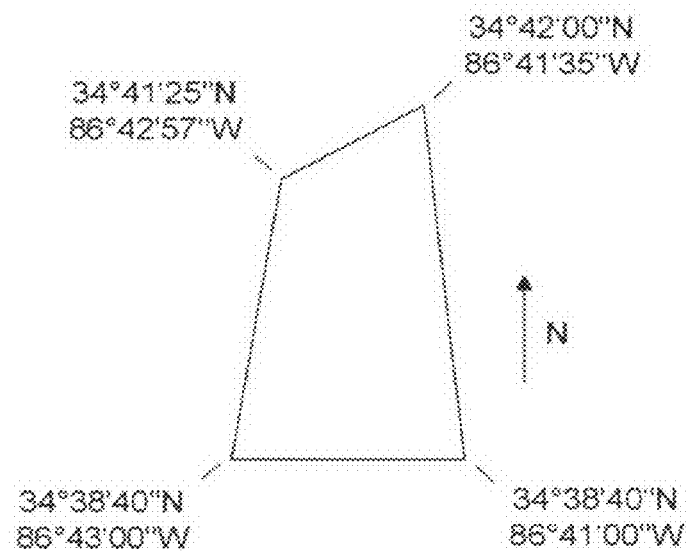
Figure 8:
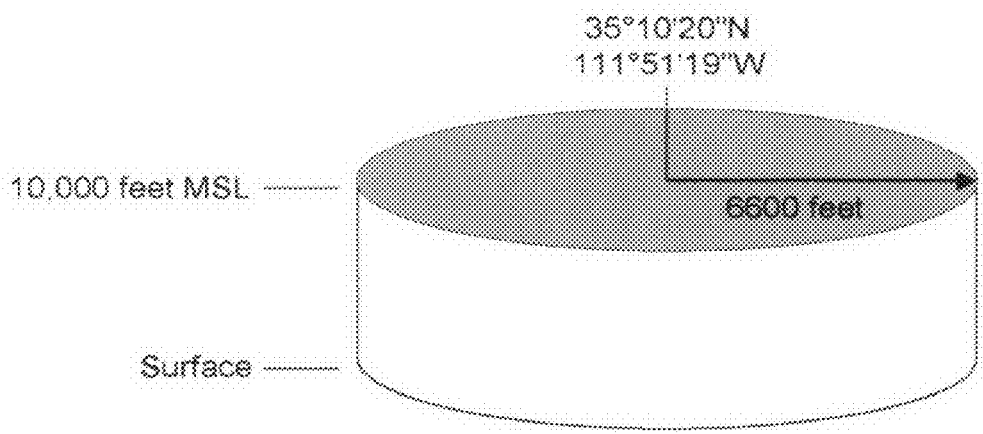
FIG. 8 provides an exemplary depiction of an airspace to illustrate vertical or perimeter surface(s) and ceiling of an airspace as described by delineated horizontal limits and designated altitudes.

The drawings of FIGS. 7A-7B and 8 provide two exemplary airspaces to illustrate vertical or perimeter surface(s) and ceiling of an airspace as described by delineated horizontal limits and designated altitudes. For the purpose of illustration only, the surface of the Earth is shown as flat in the drawings of FIGS. 7 and 8.

FIG. 7A provides an exemplary three-dimensional depiction of restricted airspace in the vicinity of Huntsville, Ala. (identified as "R-2104C"). The designated altitudes of the vertical limits of R-2104C range from the surface of the Earth to 12,000 feet MSL. The vertical faces of the airspace represent perimeter surfaces of the airspace, and the horizontal face (shown as the shaded surface) represents the ceiling. Although the "floor" of the airspace is not depicted, it is represented by the surface of the Earth bounded by the horizontal delineations.

FIG. 7B provides an exemplary depiction of the perimeter or horizontal boundary of R-2104C as viewed from the top. The delineated horizontal limits of R-2104C are described with the following latitude and longitude coordinates: Beginning at lat. 34°41'25" North (N.), long. 86°42'57" West (W.); to lat. 34°42'00"N., long. 86°41'35'W.; to lat. 34°38'40"N., long. 86°41'00"W.; to lat. 34°38'40"N., long. 86°43'00"W.; to the point of beginning. The airspace of R-2104C is in effect from 0600 to 2000 local time, Monday through Saturday; other times by NOTAM 6 hours in advance; NOTAM is an acronym known to those skilled in the art that means "Notice to Airman"—a system employed by the FAA to disseminate time-critical aeronautical information which is of either a temporary nature or not sufficiently known in advance to permit publication on aeronautical charts or in other operational publications.

FIG. 8 provides an exemplary three-dimensional depiction of restricted airspace in the vicinity of Flagstaff, Ariz. (identified as "R-2302"). The delineated horizontal limits of R-2302 consist of a circular area with a 6,600 foot radius centered at lat. 35°10'20"N, long. 111°51'19"W. The designated altitudes of the vertical limits of R-2302 range from the surface of the Earth to 10,000 feet MSL, and the boundary is in effect from 0800 to 2400 Mountain Standard Time (MST), Monday through Saturday. The cylindrical vertical face of the airspace represents perimeter surface of the airspace, and the horizontal face (shown as the shaded surface) represents the ceiling. Although the floor or the airspace is not depicted, it is represented by the surface of the Earth bounded, by the horizontal delineations.

Although the surface of the Earth provides the floor of the illustrative airspaces depicted in the drawings of FIGS. 7 and 8, the floor of an airspace may not be defined down to the surface of the Earth. For example, the floor of the R-5601E airspace discussed above is 500 feet above ground level (AGL).

Figure 9A:
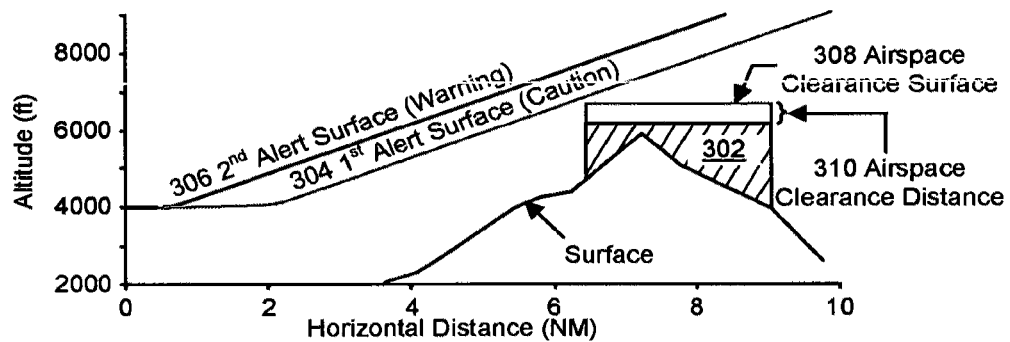
FIGS. 9A-9C provide exemplary depictions of vertical airspace alert surfaces of an aircraft in level flight.
Figure 9B:
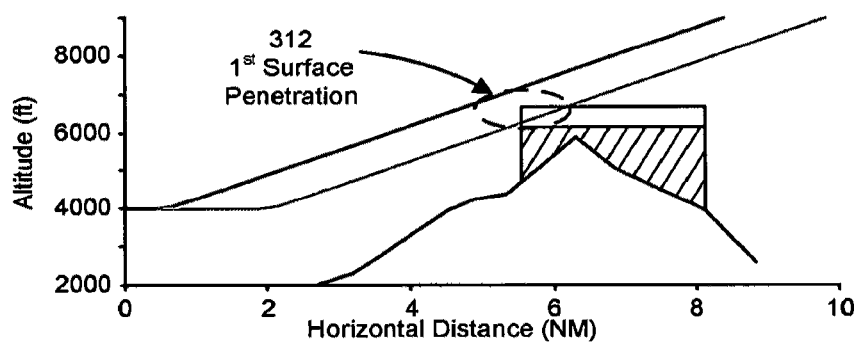
Figure 9C:
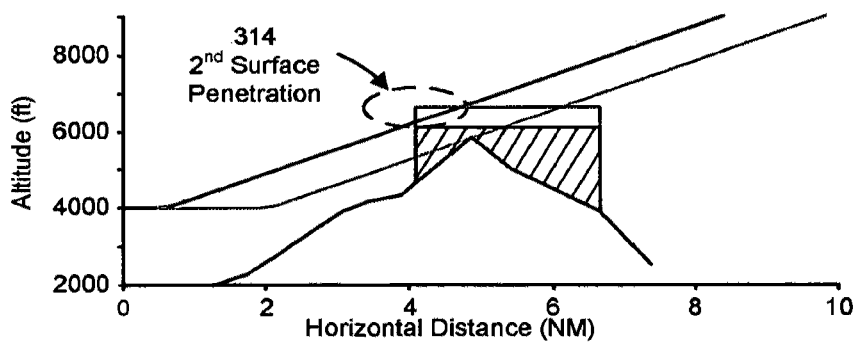

FIGS. 9A through 9C provide exemplary projections of two alerting surfaces of an aircraft operating at 4,000 feet in level flight and 500 knots which could be represented by such input factors as altitude 114, attitude 116, and speed 118. For the sake of comparison and brevity only, the exemplary projections of the terrain alert surfaces previously discussed in FIGS. 2D through 2F, FIGS. 4A through 4C, 5C through 5E, and FIGS. 6B through 6D, will be used to illustrate airspace alert surfaces in FIGS. 9A through 9C, FIGS. 10A through 10C, FIGS. 11A through 11C, and FIGS. 12A through 12C, respectively. As embodied herein, a manufacturer or end-user has the ability to define each and every terrain and airspace alert surface, and may or may not decide to use the same surface for both terrain and airspace applications. It should be noted that the use of the same alert surfaces for the sole purpose of illustrating both terrain and airspace avoidance applications in no way, shape, or form constitutes any limitation to the embodiments herein.

As shown in FIGS. 9A through 9C, the aircraft is approaching an airspace 302 (shown with diagonal hash marks) of higher altitude along its projected flight path. As embodied herein, only one alerting surface may be sufficient for a generation of an alert signal by a TA processor 190 and for the receiving of such signal by a crew alerting system 195. A first alert surface 304 is based upon maneuver profile 210 (as was first alert surface 218), and a second alert surface 306 is based upon maneuver profile 204 (as was second alert surface 220). As shown in FIG. 9A, a first alert surface 304 could be associated with a caution-type alert, and as discussed above, a caution alert may require immediate crew awareness and subsequent corrective action. Likewise, a second alert surface 306 could be associated with a warning-type alert, and as discussed above, a warning alert may require immediate crew awareness and immediate crew action.

Airspace 302 of FIGS. 9A through 9C comprises of a surface representative of the vertical or perimeter surface(s) and ceiling corresponding to the surface(s) and ceiling data that could be provided by an airspace database 135. FIGS. 9A through 9C provide an exemplary depiction of an airspace clearance surface 308 that may be projected vertically above airspace 302 at an airspace clearance distance 310 to provide vertical separation. Although not depicted, an airspace clearance surface could also be projected horizontally at a clearance distance to provide horizontal separation. Additionally, an airspace clearance surface could be projected vertically below an airspace where the floor of such airspace is sufficiently above the surface of the Earth to permit aircraft operations below it.

As embodied herein, an airspace clearance distance 310 does not have to be employed. If not employed, an airspace clearance surface 308 could be considered the same as the airspace surface 302 or coinciding with the airspace surface 302, and receipt of airspace data could constitute the receipt of data representative of an airspace clearance surface 308. For example, a manufacturer or end-user could rely only on a maneuver profile(s) profiles that define an alert surface(s) to provide clearance. In another example, an airspace database 135 may include data representative of one or more airspace clearance surfaces, and the data provided could be based upon at least one input factor data 150. In such an example, data representative of airspace clearance surface(s) could be stored in an airspace database 135 corresponding to specific phases of flight, flight attitudes, or both as discussed below.

If employed, however, the value of an airspace clearance distance 310 may not remain constant between take-off and landing. As discussed above in detail in the context of terrain avoidance, the value of airspace clearance distance 310 could depend on the different phases of flight, flight attitudes, or both for airspace avoidance. As discussed herein, airspace clearance distances are illustrations intended solely to provide examples and are in no way intended to be limited to those discussed and presented herein. As embodied herein, a TA processor 190 may determine phase of flight, flight attitude, and airspace clearance distances data using algorithms programmed in executable software code. Those skilled in the art will appreciate the ability and ease with which executable software code may be reprogrammed or modified by a manufacturer or end-user to facilitate specific performance standards or aircraft operations without affecting or expanding the scope of the embodiments discussed herein.

FIGS. 9B and 9C provide exemplary depictions of events in which an airspace clearance surface 308 penetrates two alert surfaces as the aircraft approaches airspace 302, where each event triggers an alert being that may be provided to the pilot by a crew alerting system 195. In an embodiment of FIG. 9B, a first surface penetration 312 has occurred where the airspace clearance surface 308 has penetrated a first alert surface 304 as the aircraft approaches airspace 302. Because the first alert surface 304 is associated with a caution alert in this example as discussed above, a TA processor 190 could generate a caution alert signal and provide such signal to a crew alerting system 195 as a result of the penetration. As the aircraft continues to approach airspace 302 as shown in FIG. 9C, a second surface penetration 314 has occurred where the airspace clearance surface 308 has penetrated a second alert surface 306. Because the second alert surface 306 is associated with a warning signal as discussed above, a TA processor 190 could generate a warning signal and provide such signal to the crew alerting system 195 as a result of the penetration.

As discussed above, a first alert surface 304 and a second alert surface 306 have been based upon maneuver profiles 210 and 204, respectively, where each has been based on maneuver profile 202 of a constant angle climb (e.g., six degrees) having a distance of 10 NM. As embodied herein and discussed above, however, the advantages of the embodiments herein may incorporate any profile which may be used or defined as a maneuver profile. A manufacturer or end-user of a TAWS 100 could establish or configure a plurality of maneuver profiles; on the other hand, a manufacturer or end-user of the aircraft may wish to provide a single maneuver profile under all conditions to simplify pilot training. As embodied herein, a maneuver profile may comprise of one or more vertical maneuvers, one or more horizontal maneuvers as discussed below in detail, or it may be a combination of one or more vertical and horizontal maneuvers.

Figure 10A:
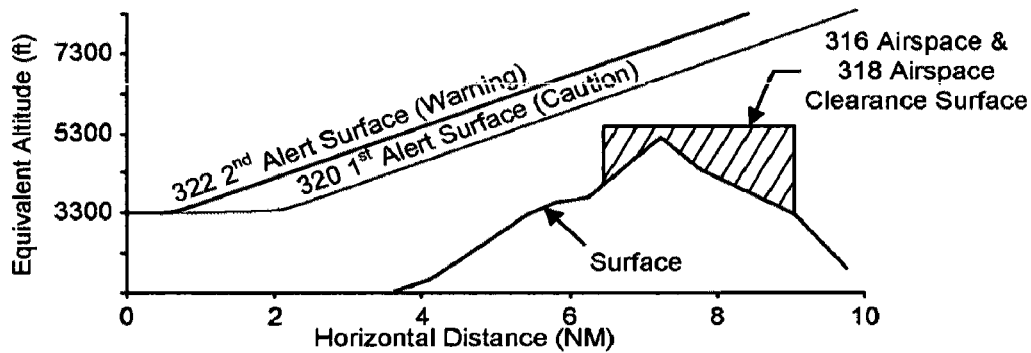
FIGS. 10A-10C provide exemplary depictions of vertical airspace alert surfaces of an aircraft in level flight where the airspace and airspace clearance surfaces coincide.
Figure 10B:
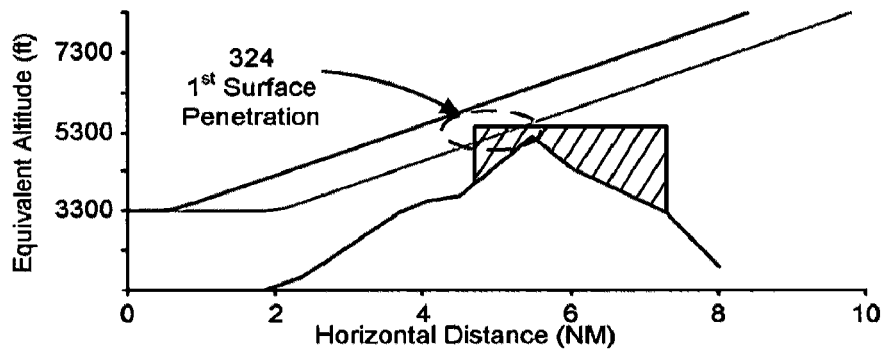
Figure 10C:
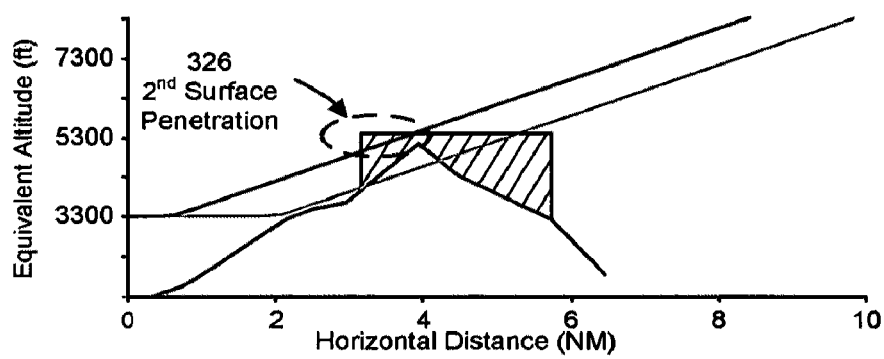

FIGS. 10A through 10C provide exemplary projections of two alert surfaces based upon the two maneuver profiles 204 and 210 of FIGS. 2B and 2C. In the embodiments of FIGS. 10A through 10C, airspace 316 and airspace clearance surface 318 coincide as depicted in FIG. 10A, which is an advantage of this embodiment because an airspace clearance distance 310 (e.g., FIG. 9A) may be omitted from the computation of an airspace clearance surface. In those embodiments where airspace and airspace clearance surface coincide, these terms may be used interchangeably. One exemplary manner to take advantage of this embodiment is to project each alert surface from an equivalent altitude that is offset by the value of a vertical airspace clearance distance 310 while the alert surface remains based upon an input factor of an altitude 114. As previously stated, an aircraft operating in level flight in the enroute phase of flight may have a vertical airspace clearance distance of 700 feet. Because a vertical airspace clearance distance is also the value of the offset, alert surfaces may be projected from the aircraft altitude of 4,000 feet to an equivalent altitude of 3,300 feet for this exemplary 700 feet vertical airspace clearance distance as shown in FIGS. 10A through 10C.

FIGS. 10B and 10C provide exemplary depictions of events in which an airspace clearance surface 318 penetrates two alert surfaces as the aircraft approaches airspace 316, where each event triggers an alert that may be provided to the pilot by a crew alerting system 195. In an embodiment of FIG. 10B, a first surface penetration 324 has occurred where the airspace clearance surface 318 has penetrated a first alert surface 320 as the aircraft approaches airspace 316. Because the first alert surface 320 is associated with a caution alert in this example as discussed above, a TA processor 190 could generate a caution alert signal and provide such signal to a crew alerting system 195 as a result of the penetration. As the aircraft continues to approach airspace 316 as shown in FIG. 10C, a second surface penetration 326 has occurred where the airspace clearance surface 318 has penetrated a second alert surface 322. Because the second alert surface 322 is associated with a warning signal as discussed above, a TA processor 190 could generate a warning signal and provide such signal to the crew alerting system 195 as a result of the penetration. It should be noted that the embodiments of FIGS. 10A through 10C may be applied for any alert surface and is not limited to the alert surfaces, phase of flight, or flight attitude depicted therein.

Figure 11A:
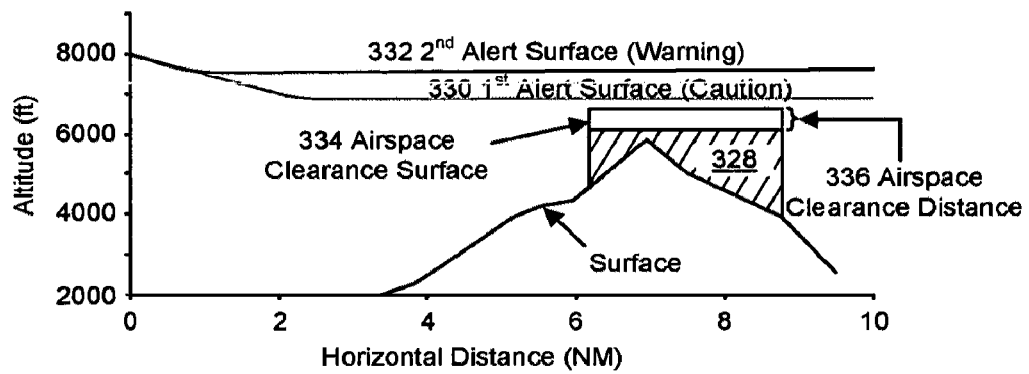
FIGS. 11A-11C provide exemplary depictions of vertical airspace alert surfaces of an aircraft in descending flight.
Figure 11B:
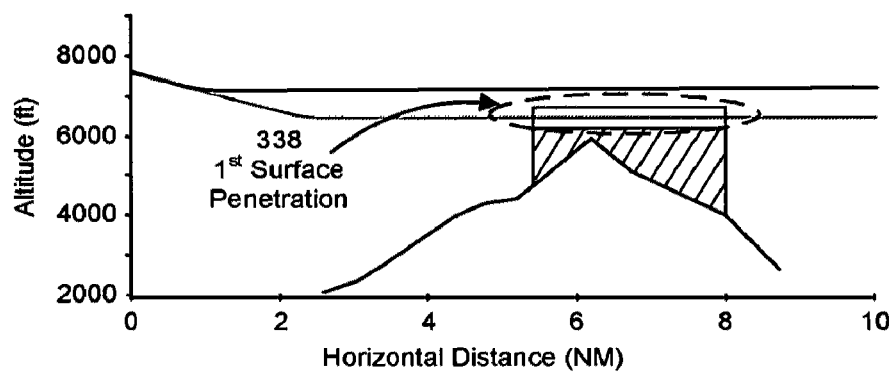
Figure 11C:
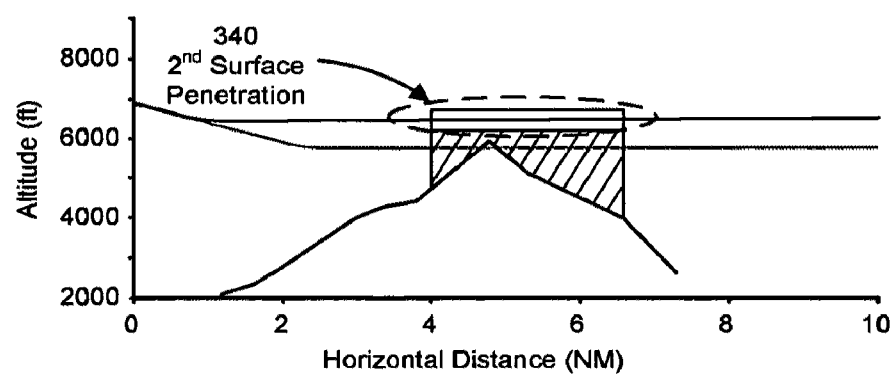

FIGS. 11A through 11C provide exemplary projections of two alerting surfaces of an aircraft descending through 6,000 feet which could be represented by input factors such as attitude 116 and altitude 114. As shown, the aircraft is approaching an airspace 328 along its projected flight path. A first alert surface 330 is based upon maneuver profile 248, and a second alert surface 332 is based upon, maneuver profile 242. As shown in FIG. 11A, a first alert surface 330 could be associated with a caution-type alert, and a second alert surface 332 could be associated with a warning-type alert.

FIGS. 11A through 11C depict of an airspace clearance surface 334 that may be projected above airspace 328 at an airspace clearance distance 336. FIGS. 11B and 11C provide exemplary depictions of events in which an airspace clearance surface 334 penetrates two alert surfaces as the aircraft approaches airspace 328, where each event triggers an alert being that may be provided to the pilot by a crew alerting system 195. In an embodiment of FIG. 11B, a first surface penetration 338 has occurred where the airspace clearance surface 334 has penetrated a first alert surface 330 as the aircraft approaches airspace 328. Because the first alert surface 330 is associated with a caution alert in this example as discussed above, a TA processor 190 could generate a caution alert signal and provide such signal to a crew alerting system 195 as a result of the penetration. As the aircraft continues to approach airspace 328 as shown in FIG. 11C, a second surface penetration 340 has occurred where the airspace clearance surface 334 has penetrated a second alert surface 332. Because the second alert surface 332 is associated with a warning signal as discussed above, a TA processor 190 could generate a warning signal and provide such signal to the crew alerting system 195 as a result of the penetration.

Figure 12A:
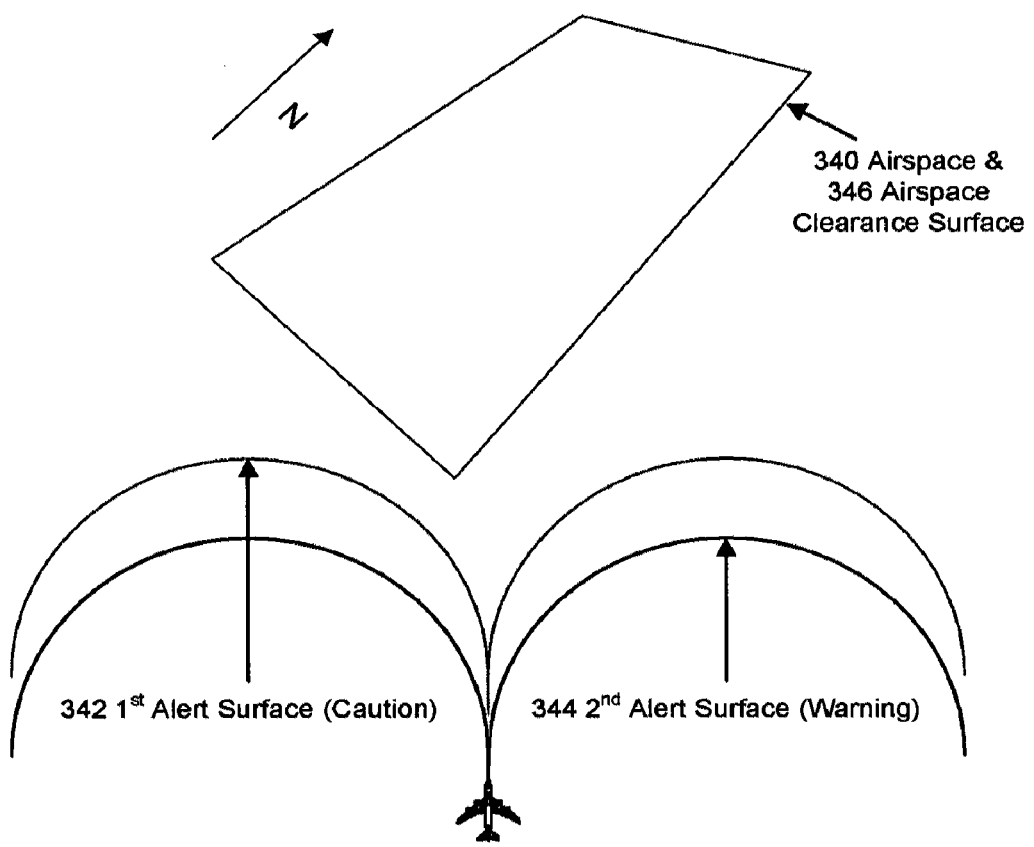
FIGS. 12A-12C provide exemplary depictions of horizontal airspace alert surfaces of an aircraft in flight.
Figure 12B:
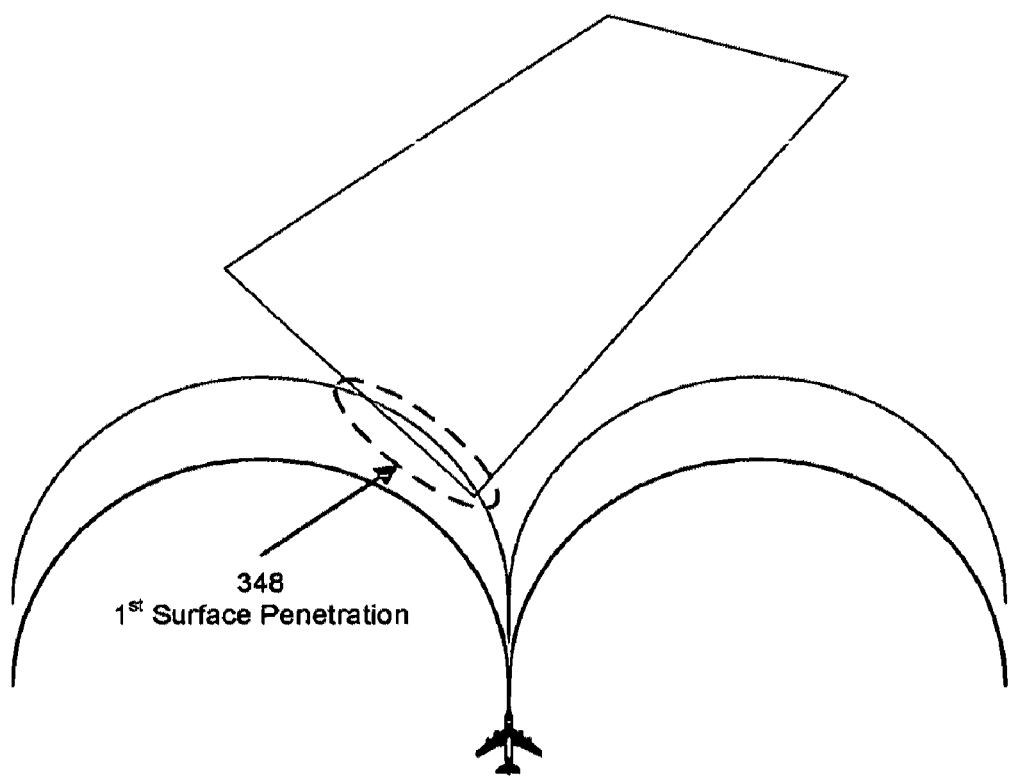
Figure 12C:
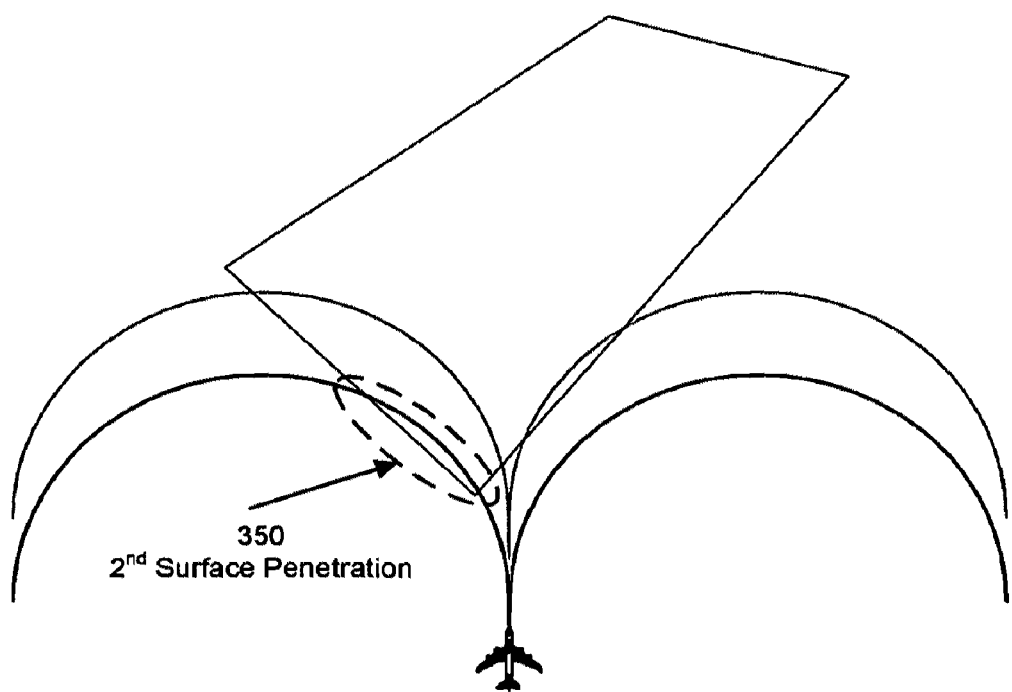

FIGS. 12A through 12C provide an exemplary depiction of an aircraft having two alerting surfaces based upon maneuver profiles 268 and 272 and approaching airspace 340 (which is the same airspace that is as shown in FIG. 7B) along its projected flight path. A first alert surface 342 is based upon maneuver profile 272, and a second alert surface 344 is based upon maneuver profile 268. As shown in FIG. 12A, a first alert surface 342 could be associated with a caution-type alert, and a second alert surface 344 could be associated with a warning-type alert.

FIGS. 12A through 12C depict an airspace clearance surface 346 that may be projected above airspace 340 at an airspace clearance distance (e.g., items 310 and 336). When viewed from above, the airspace clearance surface 346 coincides with airspace 340. FIGS. 12B and 12C provide exemplary depictions of events in which an airspace clearance surface 346 penetrates two alert surfaces as the aircraft approaches airspace 340, where each event triggers an alert that may be provided to the pilot by a crew alerting system 195. In an embodiment of FIG. 12B, a first surface penetration 348 has occurred where the airspace clearance surface 346 has penetrated a first alert surface 342 as the aircraft approaches airspace 340. Because the first alert surface 342 is associated with a caution alert in this example as discussed above, a TA processor 190 could generate a caution alert signal and provide such signal to a crew alerting system 195 as a result of the penetration. As the aircraft continues to approach airspace 340 as shown in FIG. 12C, a second surface penetration 350 has occurred where the airspace clearance surface 346 has penetrated a second alert surface 344. Because the second alert surface 344 is associated with a warning signal as discussed above, a TA processor 190 could generate a warning signal and provide such signal to the crew alerting system 195 as a result of the penetration.

It should be noted that the discussion thus far for both terrain and airspace avoidance has focused on separate vertical and horizontal profiles. Although the discussion has focused separately on maneuver profiles projected vertically and horizontally, an additional embodiment herein could provide a three-dimensional maneuver profile that may combine or incorporate both horizontal and vertical profiles, either in part or in whole. Because an alerting surface may be based upon a maneuver profile, a three-dimensional alerting surface may be based upon a three-dimensional maneuver profile.

Figure 13:
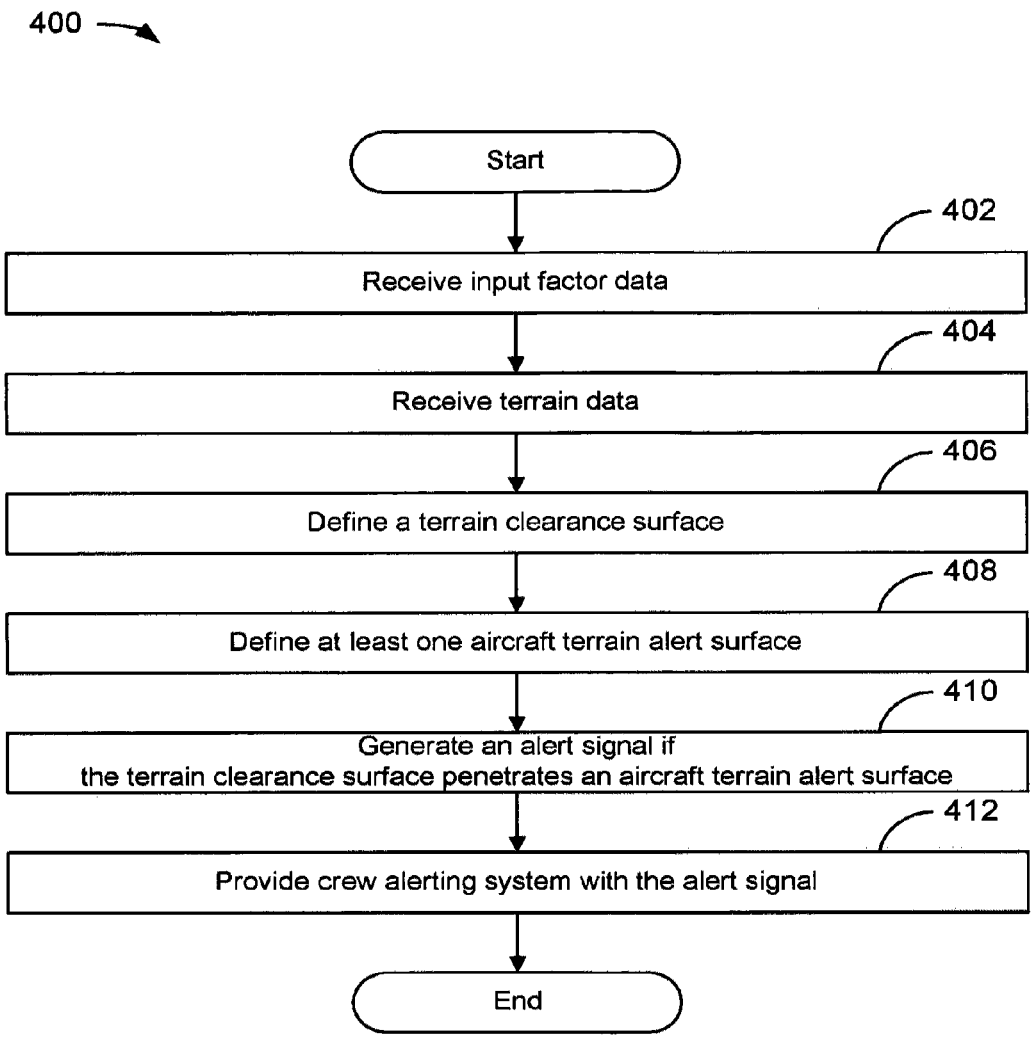
FIG. 13 provides a flowchart illustrating a method for generating an alert signal in a terrain awareness and warning system.

FIG. 13 depicts a flowchart 400 of an example of a method for generating an alert signal in a TAWS 100. The flowchart begins with module 402 with receiving of input factor data. Input factor data could comprise of data representative of at least one input factor. Examples of input factors 150 include, but are not limited to, input from a navigation system 110, an airport database 130, an airspace database 135, and a terrain database 142. The flowchart continues with module 404 with retrieving or receiving terrain data which could include data associated with terrain, obstacles, or both. Terrain data may be retrieved by a TA processor 190 or received from a plurality of sources. In one embodiment, a terrain data source 140 may be a terrain database 142; if so, such data could correspond to aircraft position provided by a navigation system 110. In another embodiment, the terrain data source 140 may be a radar system 144. In another embodiment, the terrain data source 140 may be both a terrain database 142 and a radar system 144.

The flowchart continues with module 406 with defining a terrain clearance surface. In one embodiment, a terrain clearance surface may be defined by a TA processor 190 as a function of the terrain data and at least one clearance distance criterion. In an embodiment, at least one terrain clearance distance criterion could be programmed to include input factor data 150 which may or may not comprise the same input factors used by other criteria in this method. For example, terrain clearance distance criteria could include data representative of phase of flight and flight attitude, and these criteria could be programmed to include input factors 150 of, but not limited to, geographic position 112, altitude 114, attitude 116, speed 118, vertical speed 120, and input from an airport database 130. As a result, a terrain clearance surface could be projected above a terrain surface at a distance of a terrain clearance distance after the application of at least one real-time or static input factor 150.

The flowchart continues with module 408 with defining of at least one aircraft terrain alert surface. At least one aircraft terrain alert surface could be defined by a TA processor 190 as a function of at least one criterion that has been programmed to include input factor data. Each aircraft terrain alert surface could be based upon at least one criterion programmed to include input factor data 150 which may or may not comprise the same input factors used by other criteria in this method. For example, the aircraft terrain alert surface may include pilot reaction time and G-force maneuver as criteria, and these criteria could be programmed to include an input factor 150 of speed 118 as input factor data. As a result, an aircraft terrain alert surface could be projected in front of the aircraft after the application of at least one input factor 150. As embodied herein, an aircraft terrain maneuver profile—and associated terrain alert surface—may be a vertical profile, horizontal profile, or a combination of both.

The flowchart continues with module 410 with generating a terrain alert signal if the terrain clearance service penetrates the aircraft terrain alert surface. The flowchart continues with module 412 with providing the terrain alert signal to a crew alerting system 195. In one embodiment, the alert signal could cause a presentation of a caution or warning alert on a display, an aural alert by the aural alert unit, a tactile alert by a tactile alert unit, or any combination thereof. Then, the flowchart proceeds to the end.

In an additional embodiment, the method of flowchart 400 may include the receiving of aircraft position from a navigation system 110 and airspace data corresponding to the aircraft position from an airspace data source such as an airspace database 135. Then, an airspace clearance surface could be defined. In one embodiment, an airspace clearance surface may be defined by a TA processor 190 as a function of the airspace data and at least one airspace clearance distance criterion. In an embodiment, at least one airspace clearance distance criterion could be programmed to include input factor data 150 which may or may not comprise the same input factors used by other criteria in this method. For example, airspace clearance distance criteria could include data representative of phase of flight and flight attitude, and these criteria could be programmed to include input factors 150 of, but not limited to, geographic position 112, altitude 114, attitude 116, speed 118, vertical speed 120, and input from an airport database 130. As a result, an airspace clearance surface could be projected vertically above an airspace surface at a distance of an airspace clearance distance after the application of at least one real-time or static input factor 150 to provide vertical separation. In another embodiment, an airspace clearance surface could also be projected horizontally at a clearance distance to provide horizontal separation.

Then, at least one airspace alert surface could be defined by a TA processor 190 as a function of at least one criterion that has been programmed to include input factor data 150 which may or may not comprise the same input factors used by other criteria in this method. Each airspace alert surface could be based upon at least one criterion programmed to include input factor data which may or may not comprise the same input factors used by other criteria in this method. For example, the airspace alert surface may include pilot reaction time and G-force maneuver as criteria, and these criteria could be programmed to include an input factor 150 of speed 118 as input factor data. As embodied herein, an airspace maneuver profile—and associated airspace alert surface—may be a vertical profile, horizontal profile, or a combination of both. As a result, an aircraft airspace alert surface could be projected in front of the aircraft after the application of at least one input factor 150. Then, an airspace alert signal could be generated if the airspace clearance service penetrates an aircraft airspace alert surface. Then, the airspace alert signal could be provided to a crew alerting system 195. In one embodiment, the alert signal could cause a presentation of a caution or warning alert on a display, an aural alert by the aural alert unit, a tactile alert by a tactile alert unit, or in any combination thereof.

In an additional embodiment, the method of flowchart 400 may include the receiving of aircraft position from a navigation system 110 and airspace data corresponding to the aircraft position from an airspace data source such as an airspace database 135. In one embodiment, data contained in a terrain database 142 could be provided to a TA processor 190 for determination of a surface representative of terrain elevation. In another embodiment, a terrain database 142 may be comprised of one or more databases, where each database could include data representative of one or more terrain clearance surfaces, where each terrain clearance surface could correspond to a specific phase of flight and flight attitude.

Then, at least one airspace alert surface could be defined by a TA processor 190 as a function of at least one airspace alert surface criterion that has been programmed to include input factor data 150 and at least one airspace clearance distance criterion. Each airspace alert surface could be based upon at least one criterion programmed to include input factor data 150 which may or may not comprise the same input factors used by other criteria in this method. For example, the airspace alert surface may include pilot reaction time and G-force maneuver as criteria, and these criteria could be programmed to include an input factor 150 of speed 118 as input factor data. As embodied herein, an airspace maneuver profile—and associated airspace alert surface—may be a vertical profile, horizontal profile, or a combination of both. As a result, an aircraft airspace alert surface could be projected in front of the aircraft after the application of at least one input factor 150.

At least one airspace clearance distance criteria, for example, could include data representative of phase of flight and flight attitude, and these criteria could be programmed to include input factors 150 of, but not limited to, geographic position 112, altitude 114, attitude 116, speed 118, vertical speed 120, and input from an airport database 130.

Then, an airspace alert signal could be generated if the airspace clearance service penetrates an aircraft airspace alert surface. Then, the airspace alert signal could be provided to a crew alerting system 195. In one embodiment, the alert signal could cause a presentation of a caution or warning alert on a display, an aural alert by the aural alert unit, a tactile alert unit, or in any combination thereof.

Figure 14:
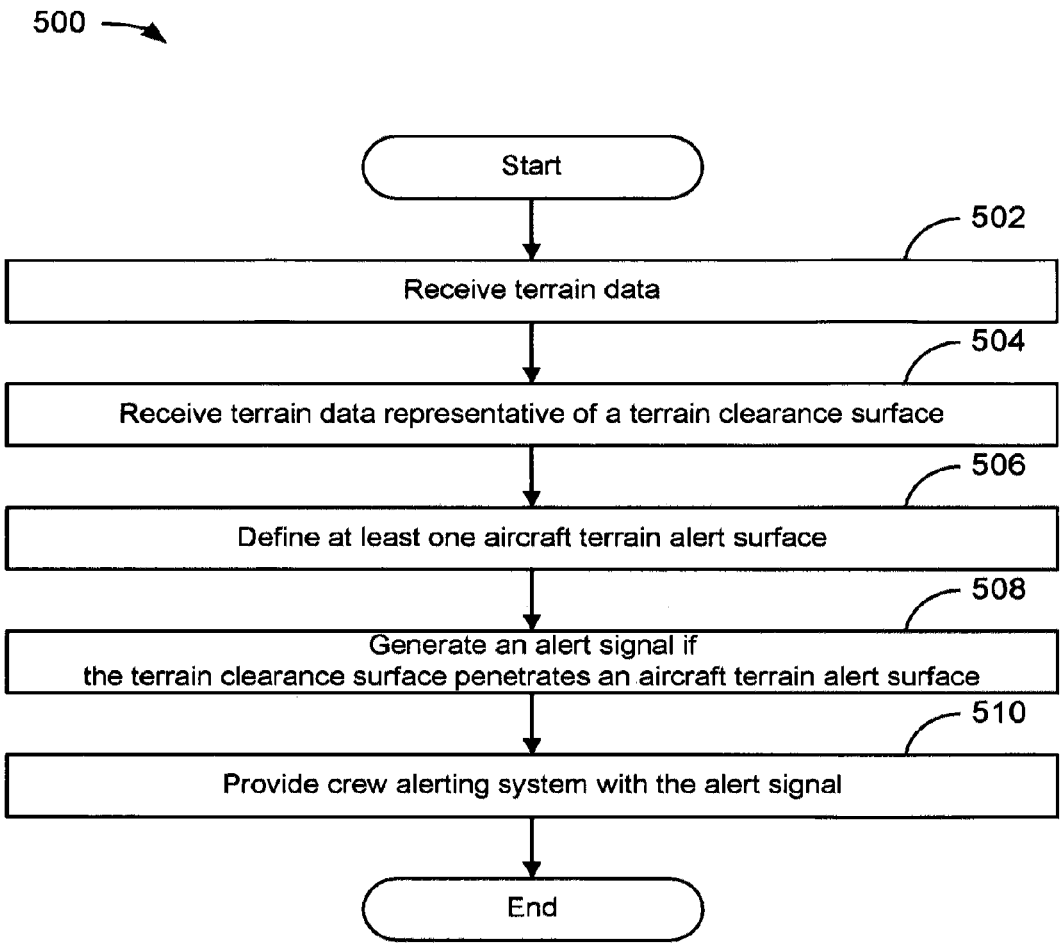
FIG. 14 provides a flowchart illustrating a second method for generating an alert signal in a terrain awareness and warning system.

FIG. 14 depicts a flowchart 500 of an example of a second method for generating an alert signal in a terrain awareness and warning system. The flowchart begins with module 502 with receiving of input factor data. Input factor data 150 could comprise of data representative of at least one input factor which may or may not comprise the same input factors used by other criteria in this method. Examples of input factors 150 include, but are not limited to, and geographic position 112, altitude 114, attitude 116, speed 118, vertical speed 120, and input from an airport database 130. The flowchart continues with module 504 with retrieving or receiving terrain data which could include data associated with terrain, obstacles, or both. The terrain data could be representative of a terrain clearance surface. Terrain data may be retrieved or received from a plurality of sources. In one embodiment, a terrain data source may be a terrain database 142; if so, such data could correspond to aircraft position provided by a navigation system 110. In another embodiment, a terrain source may be a radar system 144. In another embodiment, the terrain data source 140 may be both a terrain database 142 and a radar system 144.

The flowchart continues with module 506 with defining of at least one aircraft terrain alert surface. At least one aircraft terrain alert surface could be defined by a TA processor 190 as a function of at least one criterion that has been programmed to include input factor data and at least one terrain clearance distance criteria. Each aircraft terrain alert surface could be based upon at least one criterion programmed to include input factor data 150 which may or may not comprise the same input factors used by other criteria in this method. For example, the aircraft terrain alert surface may include pilot reaction time and G-force maneuver as criteria, and these criteria could be programmed to include an input factor 150 of speed 118 as input factor data. As embodied herein, an aircraft terrain maneuver profile—and associated terrain alert surface—may be a vertical profile, horizontal profile, or a combination of both. As a result, an aircraft terrain alert surface could be projected in front of the aircraft after the application of at least one input factor 150.

At least one terrain clearance distance criteria, for example, could include data representative of phase of flight and flight attitude, and these criteria could be programmed to include input factors 150 of, but not limited to, geographic position 112, altitude 114, attitude 116, speed 118, vertical speed 120, and input from an airport database 130. As a result, a terrain alert surface could be projected below the altitude of the aircraft at a distance of the terrain clearance distance after the application of the input factors 150.

The flowchart continues with module 508 with generating a terrain alert signal if the terrain clearance service penetrates the aircraft terrain alert surface. The flowchart continues with module 510 with providing the terrain alert signal to a crew alerting system 195. In one embodiment, the alert signal could cause a presentation of a caution or warning alert on a display, an aural alert by the aural alert unit, or both. Then, the flowchart proceeds to the end.

In additional embodiments of the method of flowchart 500, the method of flowchart 500 may include the additional embodiments disclosed in the method of flowchart 400.

It should be noted that the method steps described above are embodied in computer-readable media as computer instruction code. It shall be appreciated to those skilled in the art that not all method steps must be performed, nor must they be performed in the order stated. As embodied herein, the actions that could be performed by a TA processor 190 are includes as method steps.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for generating an alert signal in an aircraft system, said system comprising:
   at least one source of input factor data;
   a source of terrain data comprised of a forward-looking radar system configured to acquire terrain data representative of a terrain surface;
   an alert processor configured to
      receive input factor data representative of at least
         first input factors representative of information corresponding to the current geographic position and attitude of an aircraft in flight,
         a second input factor representative of information corresponding to the nearest airport from the current geographic position of the aircraft, and
         a third input factor representative of information corresponding to the current altitude of the aircraft;
      determine a phase of flight and flight attitude parameter based upon the first input factors, the second input factor, and the third input factor;
      receive terrain data from the forward-looking radar system, where
         the terrain data is representative of a terrain surface;
      define a terrain clearance surface and at least one aircraft terrain alert surface, where
         the terrain clearance surface is defined as a first function of the terrain surface, and
         each aircraft terrain alert surface is defined as a second function of at least one criterion programmed to include at least one fourth input factor, where
            either the first function or the second function includes the phase of flight and flight attitude parameter;
      generate a terrain alert signal if the terrain clearance surface penetrates an aircraft terrain alert surface; and
      provide the terrain alert signal to a crew alerting system; and
   the crew alerting system configured to receive the terrain alert signal.

2. The system of claim 1, wherein the first function includes the third input factor.

3. The system of claim 1, wherein the second function includes at least one first input factor, the second input factor, the third input factor, or any combination of these.

4. The system of claim 1, wherein the terrain data includes data representative of terrain, obstacles, or both.

5. The system of claim 1, wherein the first input factors are also representative of information corresponding to the speed of the aircraft, vertical speed of the aircraft, or both.

6. The system of claim 1, wherein the crew alerting system is comprised of at least one of the following: a display unit, an aural alert unit, and a tactile unit.

7. The system of claim 1, further comprising:
   a source of airspace data, where
      the alert processor is further configured to
         retrieve airspace data corresponding to the current geographic position, where
            the airspace data is representative of an airspace surface;
         define an airspace clearance surface and at least one aircraft airspace alert surface, where
            the airspace clearance surface is defined as a third function of the airspace surface and at least one airspace clearance distance criterion, and
            each aircraft airspace alert surface is defined as a fourth function of at least one criterion programmed to include at least one fifth input factor;
         generate an airspace alert signal if the airspace clearance surface penetrates an aircraft airspace alert surface; and
         provide the airspace alert signal to the crew alerting system; and
      the crew alerting system is further configured to receive the airspace alert signal.

8. The system of claim 7, wherein the fourth function includes at least one first input factor, the second input factor, the third input factor, at least one fourth input factor, or any combination of these.

9. The system of claim 1, further comprising:
   a source of airspace data, where
      the alert processor is further configured to
         retrieve airspace data corresponding to the current geographic position, where
            the airspace data is representative of an airspace clearance surface;
         define at least one aircraft airspace alert surface, where
            each aircraft airspace alert surface is defined as a third function of at least one criterion programmed to include at least one fifth input factor;
         generate an airspace alert signal if the airspace clearance surface penetrates an aircraft airspace alert surface;
         provide the airspace alert signal to the crew alerting system; and
      the crew alerting system is further configured to receive the airspace alert signal.

10. The system of claim 9, wherein
    the source of airspace data stores airspace data as a function of at least one airspace clearance distance criterion, and
    the retrieval of the airspace data is based upon the at least one airspace clearance distance criterion.

11. The system of claim 10, wherein one airspace clearance distance criterion is comprised of the phase of flight and flight attitude parameter.

12. The system of claim 9, wherein the third function includes at least one first input factor, the second input factor, the third input factor, at least one fourth input factor, or any combination of these.

13. A system for generating an alert signal in an aircraft system, said system comprising:
    a source of input factor data;
    a source of terrain data comprised of at least one terrain database, where
       each terrain database is
          comprised of a plurality of terrain cells, and
          configured to store terrain data representative of a terrain clearance surface defined as a function of a terrain surface and a non-zero terrain clearance distance, where
             each terrain database corresponds to one phase of flight and flight attitude parameter, or
             each terrain cell is comprised of a plurality of values, where
                each value corresponds to one phase of flight and flight attitude parameter;

an alert processor configured to
receive input factor data representative of at least
first input factors representative of information corresponding to the current geographic position and attitude of an aircraft in flight,
a second input factor representative of information corresponding to the nearest airport from the current geographic position of the aircraft, and
a third input factor representative of information corresponding to the current altitude of the aircraft;
determine a phase of flight and flight attitude parameter based upon the first input factors, the second input factor, and the third input factor;
retrieve terrain data representative of a terrain clearance surface other than a terrain surface, where
the retrieval of the terrain data is based upon the phase of flight and flight attitude parameter;
define at least one aircraft terrain alert surface, where
each aircraft terrain alert surface is defined as a first function of at least one criterion programmed to include at least one fourth input factor;
generate a terrain alert signal associated if the terrain clearance surface penetrates an aircraft terrain alert surface; and
provide the terrain alert signal to a crew alerting system; and
the crew alerting system configured to receive the terrain alert signal.

14. The system of claim 13, wherein the first function includes at least one first input factor, the second input factor, the third input factor, or any combination of these.

15. The system of claim 13, wherein the terrain data includes data representative of terrain, obstacles, or both.

16. The system of claim 13, wherein the first input factors are also representative of information corresponding to the speed of the aircraft, vertical speed of the aircraft, or both.

17. The system of claim 13, wherein the crew alerting system is comprised of one or more of the following: a display unit, an aural alert unit, and a tactile unit.

18. The system of claim 13, further comprising:
a source of airspace data, where
the alert processor is further configured to
retrieve airspace data corresponding to the current geographic position, where
the airspace data is representative of an airspace surface;
define an airspace clearance surface and at least one aircraft airspace alert surface, where
the airspace clearance surface is defined as a second function of the airspace surface and at least one airspace clearance distance criterion, and
each aircraft airspace alert surface is defined as a third function of at least one criterion programmed to include at least one fifth input factor;
generate an airspace alert signal if the airspace clearance surface penetrates an aircraft airspace alert surface; and
provide the airspace alert signal to the crew alerting system; and
the crew alerting system for receiving is further configured to receive the airspace alert signal.

19. The system of claim 18, wherein the third function includes at least one first input factor, the second input factor, the third input factor, at least one fourth input factor, or any combination of these.

20. The system of claim 13, further comprising:
a source of airspace data, where
the alert processor is further configured to receives navigation data representative of aircraft,
retrieve airspace data corresponding to the current geographic position, where
the airspace data is representative of an airspace clearance surface;
define at least one aircraft airspace alert surface, where
each aircraft airspace alert surface is defined as a second function of at least one criterion programmed to include at least one fifth input factor;
generate an airspace alert signal if the airspace clearance surface penetrates an aircraft airspace alert surface; and
provide the airspace alert signal to the crew alerting system; and
the crew alerting system is further configured to receive the airspace alert signal.

21. The system of claim 20, wherein
the source of airspace data stores the airspace data as a function of at least one airspace clearance distance criterion, and
the retrieval of the airspace data is based upon the at least one airspace clearance distance criterion.

22. The system of claim 21, wherein one airspace clearance distance criterion is comprised of the phase of flight and flight attitude parameter.

23. The system of claim 20, wherein the second function includes at least one first input factor, the second input factor, the third input factor, at least one fourth input factor, or any combination of these.

24. A method for generating an alert signal in an aircraft system, said method comprising:
receiving input factor data representative of at least
first input factors representative of information corresponding to the current position and attitude of an aircraft in flight,
a second input factor representative of information corresponding to the nearest airport from the current geographic position of the aircraft, and
a third input factor representative of information corresponding to the current altitude of the aircraft;
determining a phase of flight and flight attitude parameter based upon the first input factors, the second input factor, and the third input factor;
receiving terrain data from a forward-looking radar system configured to acquire terrain data representative of a terrain surface;
defining a terrain clearance surface and at least one aircraft terrain alert surface, where
the terrain clearance surface is defined as a first function of the terrain surface, and
each aircraft terrain alert surface is defined as a second function of at least one criterion programmed to include at least one fourth input factor, where
either the first function or the second function includes the phase of flight and flight attitude parameter;
generating a terrain alert signal if the terrain clearance surface penetrates an aircraft terrain alert surface; and
providing the terrain alert signal to a crew alerting system.

25. The method of claim 24, wherein
the first function includes the third input factor,
the second function includes at least one first input factor, the second input factor, the third input factor, or any combination of these, or
the first function includes the third input data and the second function includes at least one first input factor, the second input factor, the third input factor, or any combination of these.

26. The method of claim 24, wherein the first input factors are also representative of information corresponding to the speed of the aircraft, vertical speed of the aircraft, or both.

27. The method of claim 24, further comprising:
retrieving airspace data corresponding to the current geographic position, where
the airspace data is representative of an airspace surface;
defining an airspace clearance surface and at least one aircraft airspace alert surface, where
the airspace clearance surface is defined as a third function of the airspace surface and at least one airspace clearance distance criterion, and
each aircraft airspace alert surface is defined as a fourth function of at least one criterion programmed to include at least one fifth input factor;
generating an airspace alert signal if the airspace clearance surface penetrates an aircraft airspace alert surface; and
providing the airspace alert signal to the crew alerting system.

28. The method of claim 24, wherein the fourth function includes at least one first input factor, the second input factor, the third input factor, at least one fourth input factor, or any combination of these.

29. The method of claim 24, further comprising:
retrieving airspace data corresponding to the current geographic position, where
the airspace data is representative of an airspace clearance surface;
defining at least one aircraft airspace alert surface, where
each aircraft airspace alert surface is defined as a third function of at least one criterion programmed to include fifth input factor data;
generating an airspace alert signal if the airspace clearance surface penetrates an aircraft airspace alert surface; and
providing the airspace alert signal to the crew alerting system.

30. The method of claim 29, wherein
the airspace data is retrieved from a database storing airspace data as a function of at least one airspace clearance distance criterion, and
the retrieving of the airspace data is based upon the at least one airspace clearance distance criterion.

31. The method of claim 30, wherein one airspace clearance distance criterion is comprised of the phase of flight and flight attitude parameter.

32. The method of claim 29, wherein the third function includes at least one first input factor, the second input factor, the third input factor, at least one fourth input factor, or any combination of these.

33. A method for generating an alert signal in an aircraft system, said method comprising:
receiving the input factor data representative of at least
first input factors representative of information corresponding to the current geographic position and attitude of an aircraft in flight,
a second input factor representative of information corresponding to the nearest airport from the current geographic position of the aircraft, and
a third input factor representative of information corresponding to the current altitude of the aircraft;
determining a phase of flight and flight attitude parameter based upon the first input factors, the second input factor, and the third input factor;
retrieving terrain data representative of a terrain clearance surface from a other than a terrain surface from at least one terrain database, where
the retrieval of the terrain data is dependent upon the phase of flight and flight attitude parameter, and
each terrain database is
comprised of a plurality of terrain cells, and
configured to store terrain data representative of a terrain clearance surface defined as a function of a terrain surface and a non-zero terrain clearance distance, where
each terrain database corresponds to one phase of flight and flight attitude parameter, or
each terrain cell is comprised of a plurality of values, where
each value corresponds to one phase of flight and flight attitude parameter;
defining at least one aircraft terrain alert surface, where
each aircraft terrain alert surface is defined as a first function of at least one criterion programmed to include at least one fourth input factor;
generating a terrain alert signal associated if the terrain clearance surface penetrates an aircraft terrain alert surface; and
providing the terrain alert signal to a crew alerting system.

34. The method of claim 33, wherein the first function includes at least one first input factor, the second input factor, the third input factor, or any combination of these.

35. The method of claim 33, wherein the terrain data includes data representative of terrain, obstacles, or both.

36. The method of claim 33, wherein the first input factors are also representative of information corresponding to the speed of the aircraft, vertical speed of the aircraft, or both.

37. The method of claim 33, further comprising:
retrieving airspace data corresponding to the current geographic position, where
the airspace data is representative of an airspace surface;
defining an airspace clearance surface and at least one aircraft airspace alert surface, where
the airspace clearance surface is defined as a second function of the airspace surface and at least one airspace clearance distance criterion, and
each aircraft airspace alert surface is defined as a third function of at least one criterion programmed to include at least one fifth input factor;
generating an airspace alert signal if the airspace clearance surface penetrates an aircraft airspace alert surface; and
providing the airspace alert signal to the crew alerting system.

38. The method of claim 37, wherein the third function includes at least one first input factor, the second input factor, the third input factor, at least one fourth input factor, or any combination of these.

39. The method of claim 33, further comprising:
retrieving airspace data corresponding to the current geographic position, where
the airspace data is representative of an airspace clearance surface;
defining at least one aircraft airspace alert surface, where
each aircraft airspace alert surface is defined as a second function of at least one criterion programmed to include at least one fifth input factor;

generating an airspace alert signal if the airspace clearance surface penetrates an aircraft airspace alert surface; and providing the airspace alert signal to the crew alerting system.

40. The method of claim 39, wherein the airspace data is retrieved from a database storing airspace data as a function of at least one airspace clearance distance criterion, and the retrieving of the airspace data is based upon the at least one airspace clearance distance criterion.

41. The method of claim 40, wherein one airspace clearance distance criterion is comprised of the phase of flight and flight attitude parameter.

42. The method of claim 39, wherein the second function includes at least one first input factor, the second input factor, the third input factor, at least one fourth input factor, or any combination of these.

* * * * *